US012313902B2

(12) United States Patent
Fan et al.

(10) Patent No.: US 12,313,902 B2
(45) Date of Patent: May 27, 2025

(54) OPTICAL ELEMENT DRIVING MECHANISM

(71) Applicant: TDK TAIWAN CORP., Taoyuan (TW)

(72) Inventors: Kai-Po Fan, Taoyuan (TW); Shao-Chung Chang, Taoyuan (TW); Guan-Bo Wang, Taoyuan (TW); Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 616 days.

(21) Appl. No.: 17/675,525

(22) Filed: Feb. 18, 2022

(65) Prior Publication Data

US 2022/0269037 A1    Aug. 25, 2022

Related U.S. Application Data

(60) Provisional application No. 63/151,204, filed on Feb. 19, 2021.

(51) Int. Cl.
| | | |
|---|---|---|
| *G02B 7/09* | (2021.01) | |
| *G02B 7/04* | (2021.01) | |
| *G02B 26/08* | (2006.01) | |
| *G02B 27/64* | (2006.01) | |
| *G03B 5/00* | (2021.01) | |
| *H04N 23/54* | (2023.01) | |
| *H04N 23/55* | (2023.01) | |
| *H04N 23/68* | (2023.01) | |

(52) U.S. Cl.
CPC ............... *G02B 7/09* (2013.01); *G02B 7/04* (2013.01); *G02B 26/08* (2013.01); *G02B 27/646* (2013.01); *G03B 5/00* (2013.01); *H04N 23/54* (2023.01); *H04N 23/55* (2023.01); *H04N 23/687* (2023.01); *G03B 2205/0069* (2013.01)

(58) Field of Classification Search
CPC .......... G02B 7/09; G02B 7/04; G02B 27/646; G02B 7/08; G02B 13/001; G02B 7/00; G03B 5/00; G03B 3/10; G03B 5/02; G03B 30/00; G03B 2205/0069; G03B 2205/0015; H04N 23/54; H04N 23/55; H04N 23/687
See application file for complete search history.

(56) References Cited

U.S. PATENT DOCUMENTS

2018/0224631 A1* 8/2018 Ichihashi ............... H01H 47/22

FOREIGN PATENT DOCUMENTS

CN           104847823 A  *  8/2015  ............... F16F 1/18

* cited by examiner

*Primary Examiner* — Mustak Choudhury
(74) *Attorney, Agent, or Firm* — Muncy, Geissler, Olds & Lowe, P.C.

(57) ABSTRACT

An optical element driving mechanism is provided. The optical element driving mechanism includes a fixed portion, a first movable portion, and a second driving assembly. The first movable portion and the fixed portion are arranged in a main axis. The first movable portion is movable relative to the fixed portion. The second driving assembly is used for driving the first movable portion to move relative to the fixed portion. When viewed along the main axis, the first movable portion includes a frame, the frame is polygonal, and has a second concave portion at the corner.

20 Claims, 34 Drawing Sheets

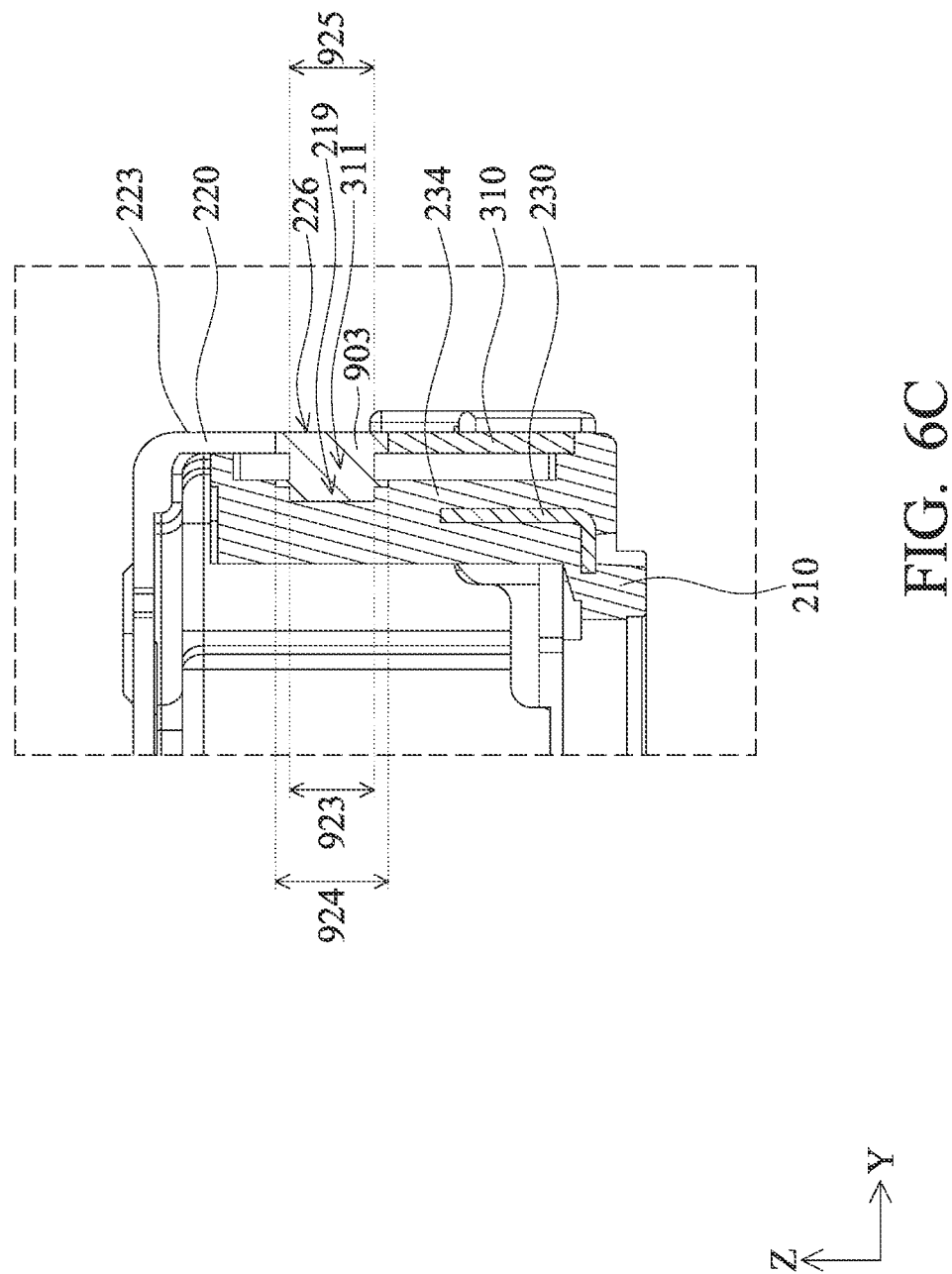

OPTICAL ELEMENT DRIVING MECHANISM

CROSS REFERENCE TO RELATED APPLICATIONS

This application claims the benefit of U.S. Provisional Application No. 63/151,204, filed on Feb. 19, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical element driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical element driving mechanism and how to increase its durability has become an important issue.

BRIEF SUMMARY OF THE INVENTION

An optical element driving mechanism is provided in some embodiments. The optical element driving mechanism includes a fixed portion, a first movable portion, and a second driving assembly. The first movable portion and the fixed portion are arranged in a main axis. The first movable portion is movable relative to the fixed portion. The second driving assembly is used for driving the first movable portion to move relative to the fixed portion. When viewed along the main axis, the first movable portion includes a frame, the frame is polygonal, and has a second concave portion at the corner.

In some embodiments, the frame includes a first surface perpendicular to the main axis, a second surface perpendicular to the main axis, a third surface parallel to the main axis, a first opening on the first surface, a second opening on the second surface, a third opening on the third surface, a fourth opening on the third surface, a first protruding portion on the first surface, a first concave portion on the first surface, and a third concave portion on the third surface.

In some embodiments, the first surface does not intersect the second surface. The first movable portion further includes a bottom. The first protruding portion protrudes from the first surface to a direction that is away from the bottom. The first concave portion is concave from the surface to the bottom. The second opening is at the corner of the frame. When viewed along the main axis, the second concave portion is concave to the main axis. When viewed along the main axis, the bottom is polygonal. The bottom includes a first strengthening portion at a corner of the bottom. The first strengthening portion corresponds to the second concave portion. The first strengthening portion extends in a direction that the main axis extends. When viewed along the main axis, the distance between the second concave portion and the main axis is less than the distance between the first strengthen portion and the main axis. In a direction that is perpendicular to the main axis, at least a portion of the first strengthen portion overlaps the second concave portion.

In some embodiments, the optical element driving mechanism further includes a first adhesive element, a holder used for connecting to an optical element, and a first driving assembly used for driving the holder to move relative to the first movable portion. The first driving assembly includes a first driving element disposed on the frame, and a second driving element disposed on the holder. The second concave portion includes a fourth surface facing the first driving element and is parallel to the main axis, and a fifth surface perpendicular to the main axis. The first adhesive element is in direct contact with the first driving element, the fourth surface, and the fifth surface.

In some embodiments, the optical element driving mechanism further includes a second adhesive element disposed on the frame, a first circuit element disposed on the first movable portion, a second circuit element disposed on the first movable portion, a first conductive element disposed on the first circuit element and the second circuit element, a third adhesive element disposed on the first circuit element, and a fourth adhesive element disposed on the first circuit element. The second adhesive element is in direct contact with the first surface. The second adhesive element is in direct contact with the second surface. The second adhesive element is disposed on the second opening.

In some embodiments, when viewed in a direction that is perpendicular to the main axis and calculated from the second surface, a first height of the second adhesive element is different from a second height of the first protruding portion. When viewed along the main axis, the second adhesive element does not overlap the first protruding portion. In a direction that is perpendicular to the main axis, at least a portion of the second adhesive element overlaps the first protruding portion. The second circuit element is embedded in the frame. When viewed in a direction that is perpendicular to the main axis, at least a portion of the first circuit element overlaps the second circuit element. The first circuit element includes a fifth opening and a fourth concave portion.

In some embodiments, when viewed in a direction that is perpendicular the main axis, at least a portion of the second circuit element is exposed from the fourth concave portion. When viewed in a direction that is perpendicular the main axis, at least a portion of the fourth adhesive element overlaps the first conductive element. When viewed in a direction that is perpendicular the main axis, at least a portion of the fourth adhesive element overlaps the fourth concave portion. When viewed in a direction that is perpendicular the main axis, a portion of the frame is exposed form the fifth opening. When viewed in a direction that is perpendicular the main axis, the third adhesive element covers the fifth opening. The fourth adhesive element is disposed on the third concave portion.

In some embodiments, the bottom further includes a first recess, a second recess, a third recess, a fourth recess, a fifth recess, a sixth recess, a seventh recess, an eighth recess, and a ninth recess on a sixth surface of the bottom, a first supporting portion extending along the main axis, a second supporting portion extending along the main axis, a third supporting portion extending along the main axis, a fourth supporting portion extending along the main axis, a first extending portion position on the second supporting portion and extending in a direction that is perpendicular to the main axis, a second extending portion position on the third supporting portion and extending in a direction that is perpendicular to the main axis, and a third extending portion position on the fourth supporting portion and extending in a direction that is perpendicular to the main axis.

In some embodiments, the second circuit element includes a first circuit unit exposed from the sixth surface, a second circuit unit exposed from the sixth surface, a third circuit unit exposed from the sixth surface, a fourth circuit unit exposed from the sixth surface, a fifth circuit unit exposed from the sixth surface, and a sixth circuit unit exposed from the sixth surface.

In some embodiments, when viewed in a direction that is perpendicular to the main axis, the first recess, the second recess, the third recess, and the fourth recess are adjacent to the first circuit unit. The first recess and the third recess are at opposite sides of the first circuit unit. The first recess and the third recess are arranged in a direction that is perpendicular to the main axis. The second recess and the fourth recess are at opposite sides of the first circuit unit. The second recess and the fourth recess are arranged in a direction that is perpendicular to the main axis. The first recess and the second recess are arranged in a direction that is parallel to the main axis.

In some embodiments, the third recess and the fourth recess are arranged in a direction that is parallel to the main axis. The first circuit unit has a third height in the direction that the main axis extends. The second circuit unit has a fourth height in the direction that the main axis extends. The fourth circuit unit has a fifth height in the direction that the main axis extends. The first supporting portion has a sixth height in the direction that the main axis extends. The third height and the fourth height are different. The third height and the fifth height are different. The third height and the sixth height are different.

In some embodiments, the first circuit element is between the first supporting portion and the second supporting portion. The fifth recess, the sixth recess, the seventh recess, and the eighth recess are arranged in a direction that is perpendicular to the main axis. The fourth recess is adjacent to the second circuit element. The fourth circuit unit is between the fifth recess and the sixth recess. The fifth circuit unit is between the sixth recess and the seventh recess. The sixth circuit unit is between the seventh recess and the eighth recess. The ninth recess is position on the fourth supporting portion. The first extending portion is in direct contact with the first circuit element. The second extending portion is in direct contact with the first circuit element. The third extending portion is in direct contact with the first circuit element.

In some embodiments, the first extending portion and the first circuit element are arranged in the direction that the main axis extends. The second extending portion and the first circuit element are arranged in the direction that the main axis extends. The third extending portion and the first circuit element are arranged in the direction that the main axis extends. The second adhesive element covers the second opening. When viewed along a direction that is perpendicular to the main axis and calculating from the second surface, the first height of the second adhesive element is greater than the second height of the first protruding portion.

In some embodiments, the third adhesive element is disposed between the first circuit element and the bottom. The third adhesive element is disposed in the ninth recess. When viewed along a direction that is perpendicular to the main axis, the third adhesive element has a third width between the first circuit element and the bottom. When viewed along a direction that is perpendicular to the main axis, the ninth recess has a fourth width in the direction that the main axis extends. The third width is greater than the fourth width. When viewed in a direction that is perpendicular to the main axis, the fifth opening has a fifth width. The third width is greater than the fifth width. The third height is greater than the fourth height. The third height is greater than the fifth height. The third height is less than the sixth height. The fourth height is less than the fifth height.

In some embodiments, the bottom surface includes a fifth opening, a sixth opening, a seventh opening, and an eighth opening disposed on a seventh surface of the bottom. The seventh surface is perpendicular to the main axis. The seventh surface faces away from the fixed portion. The second circuit element further includes a first circuit contact, a second circuit contact, a third circuit contact, and a fourth circuit contact exposed from the seventh surface. The optical element driving mechanism further includes a second conductive element, a third conductive element, a fourth conductive element, and a fifth conductive element disposed on the first circuit contact, the second circuit contact, the third circuit contact, and the fourth circuit contact, respectively. When viewed along the main axis, the first circuit contact, the second circuit contact, the third circuit contact, and the fourth circuit contact at least partially expose from the second conductive element, the third conductive element, the fourth conductive element, and the fifth conductive element, respectively.

In some embodiments, the second conductive element and the third conductive element are position at a side of the main axis that is opposite to the fourth conductive element and the fifth conductive element. When viewed in a direction that is perpendicular to the main axis, the fifth opening has a minimum dimension that equals to a first width. The optical element driving mechanism further includes a sixth adhesive element disposed between the bottom and the second driving assembly. The sixth adhesive element is disposed in the fifth opening and has a second width. The second width is greater than the first width. The fifth opening and the seventh opening have different shapes. The fifth opening and the eighth opening have different shapes. The sixth opening and the seventh opening have different shapes. The sixth opening and the eighth opening have different shapes.

In some embodiments, when viewed in a direction that is perpendicular to the main axis, the holder includes a first holder recess exposed from the second driving element, a second holder recess at least partially overlaps the second driving element, a third holder recess at least partially overlaps the second driving element, and a tilted surface between the first holder recess and the second holder recess.

In some embodiments, when viewed along the main axis, at least a portion of the first holder recess overlaps the second driving element. When viewed along the main axis, at least a portion of the second holder recess overlaps the second driving element. When viewed along the main axis, the third holder recess is exposed from the second driving element. When viewed in a direction that is perpendicular to the main axis, the tilted surface is exposed from the second driving element. When viewed along the main axis, the holder further includes a first stopping portion and a second stopping portion extending in a direction that is perpendicular to the main axis. When viewed along the main axis, the first stopping portion is between the second supporting portion and the third supporting portion. When viewed along the main axis, the second stopping portion is between the third supporting portion and the fourth supporting portion. When viewed along the main axis, in a direction that is perpendicular to the main axis, the distance between the holder and the fourth supporting portion is less than the distance between the second stopping portion and the first circuit element.

In some embodiments, the optical element driving mechanism further includes a third resilient element disposed between the frame and the fixed portion, and a seventh adhesive element disposed on the third resilient element. When viewed along the main axis, the third resilient element is polygonal and includes a main body and an outer string portion, the outer string portion is position at a corner of the main body and extends from the main body in a direction that is far away from the main axis. The seventh adhesive element is disposed on the outer string portion. The seventh adhesive element does not overlap the second opening. The seventh adhesive element does not overlap the second adhesive element. The seventh adhesive element is in direct contact with the fixed portion. The outer string portion surrounds the second adhesive element. The first protruding portion is exposed from the third resilient element. The third resilient element covers the first concave portion.

In some embodiments, the second driving assembly includes a substrate disposed on the fixed portion, a second movable portion disposed on the bottom, a third circuit element disposed on the substrate, a third driving element used for driving the second movable portion to move relative to the fixed portion, and a connecting element movably connects the second movable portion and the third circuit element. The second movable portion includes a first connecting portion. The third circuit element includes a second connecting portion. The third driving element is in direct contact with the first connecting portion and the second connecting portion.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 6C is an enlarged cross-sectional view of the optical element driving mechanism

DETAILED DESCRIPTION OF THE INVENTION

Figure 1A:
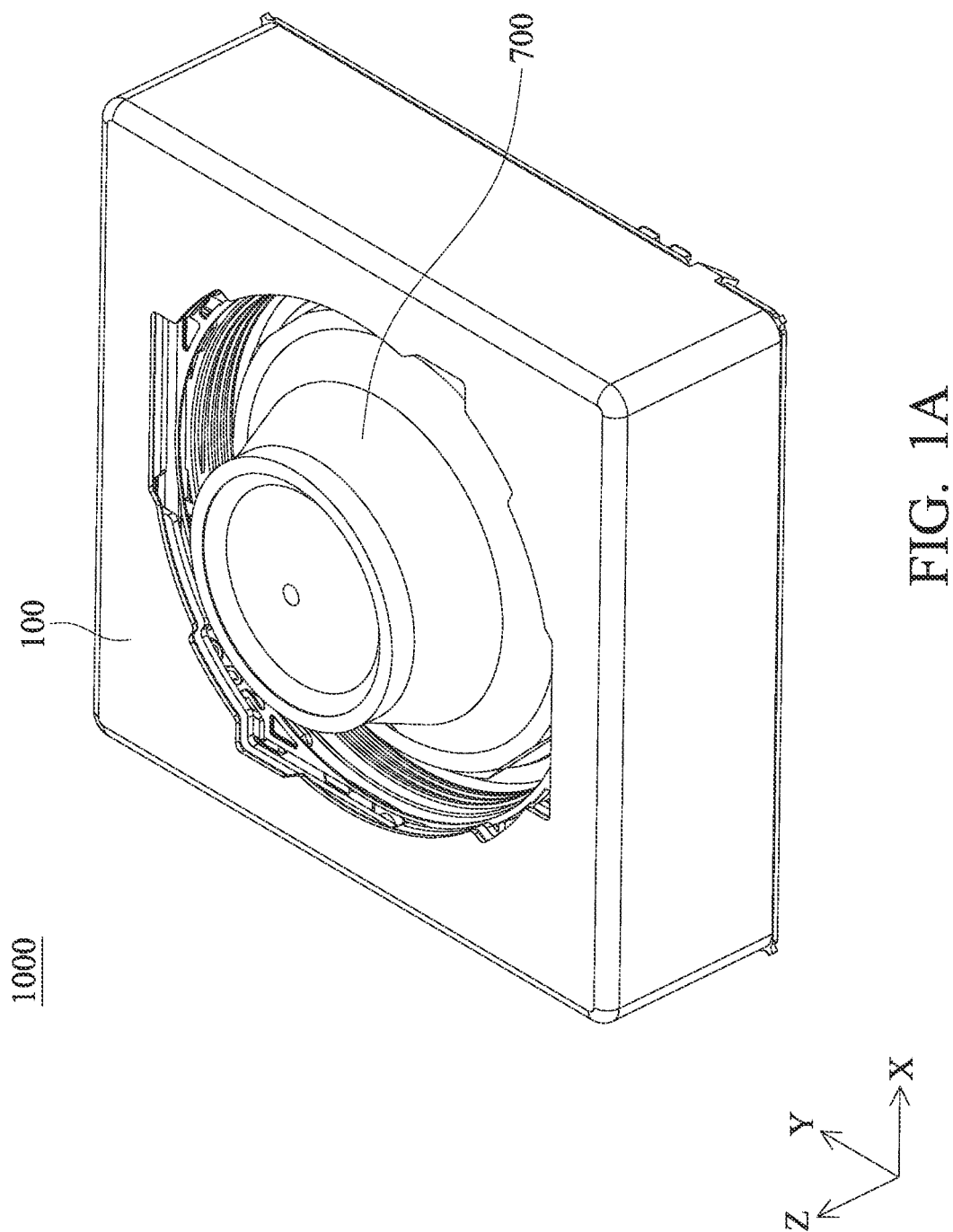
FIG. 1A is a schematic view of an optical element driving mechanism.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
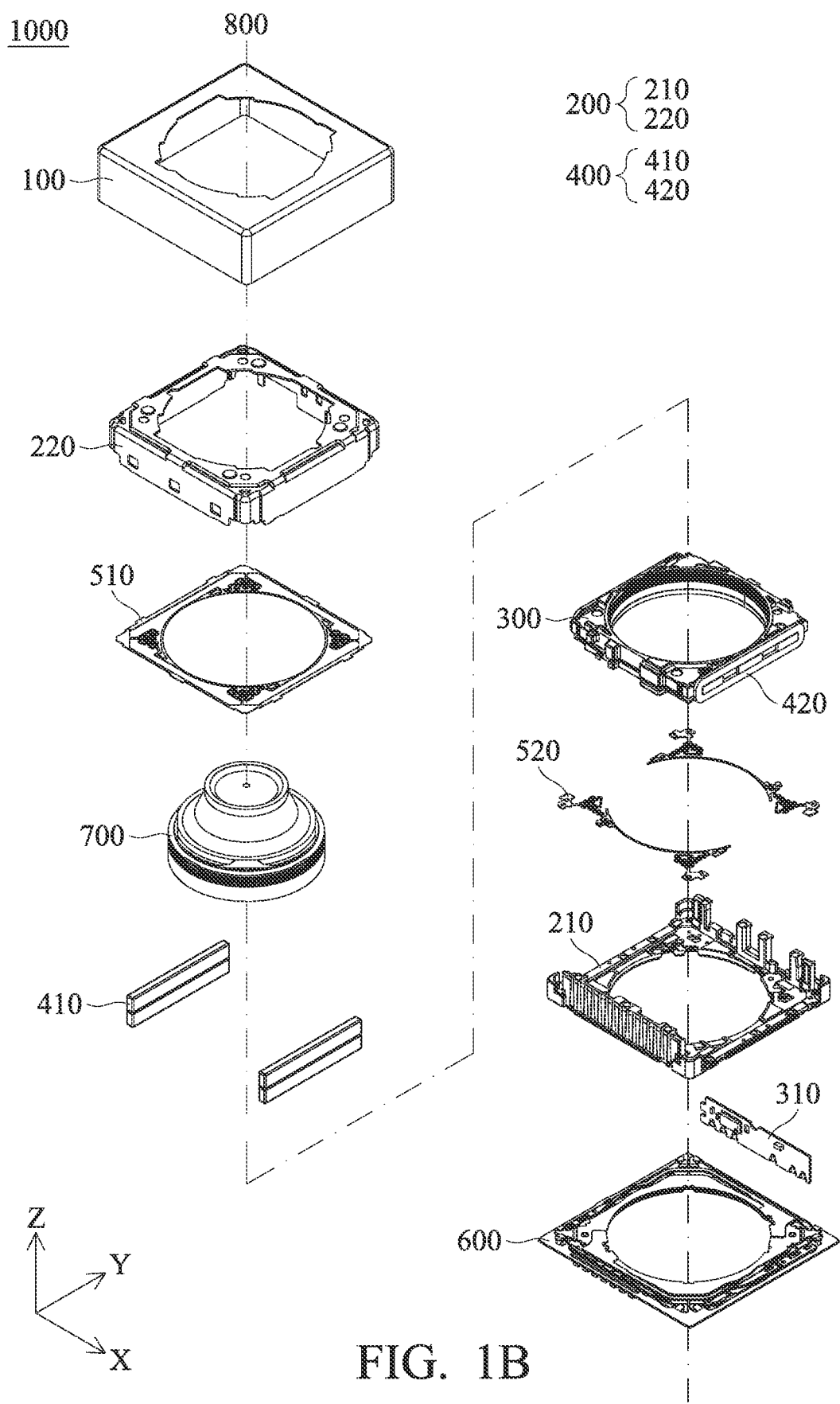
FIG. 1B is an exploded view of the optical element driving mechanism.
Figure 1C:
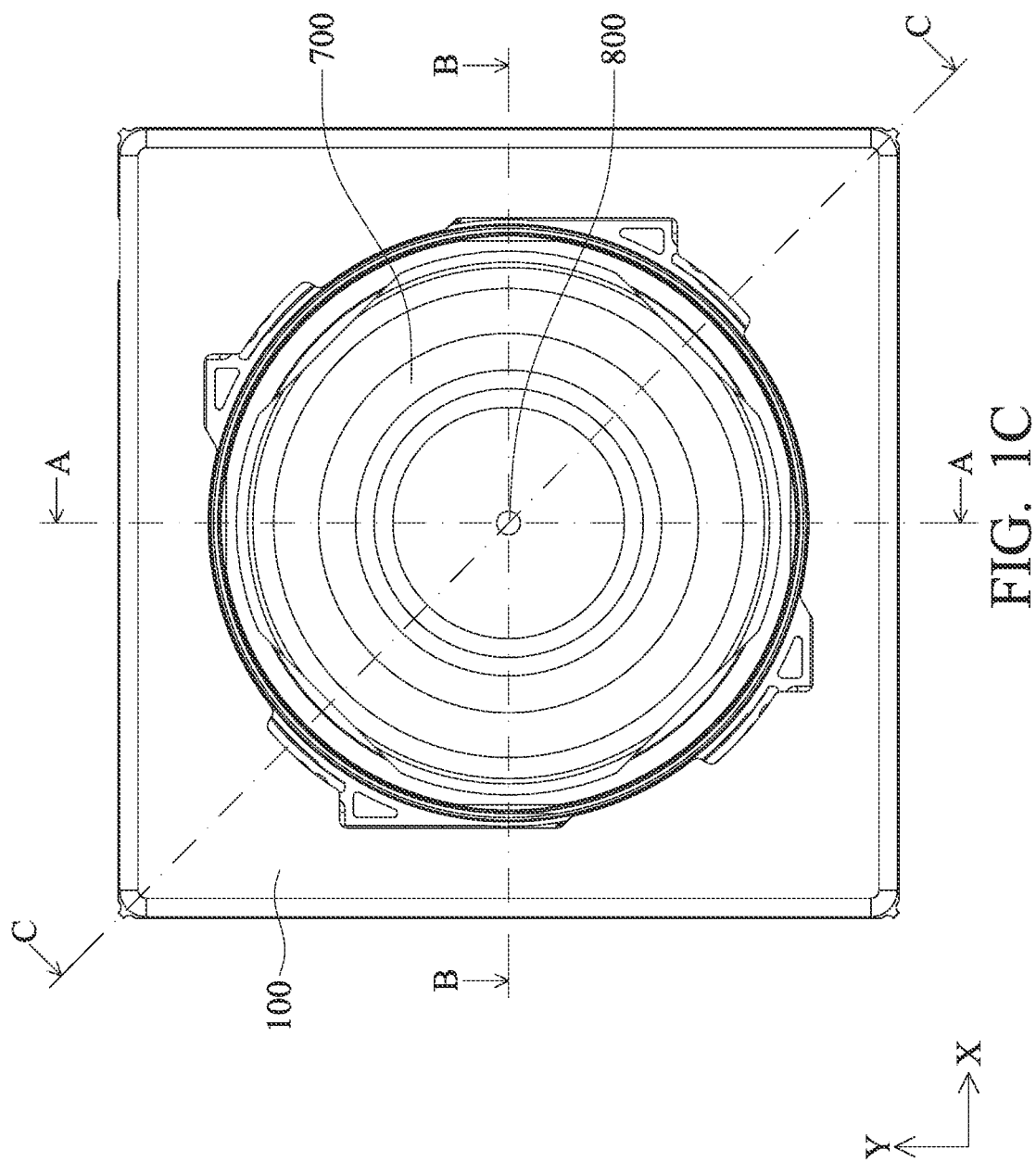
FIG. 1C is a top view of the optical element driving mechanism.
Figure 1D:
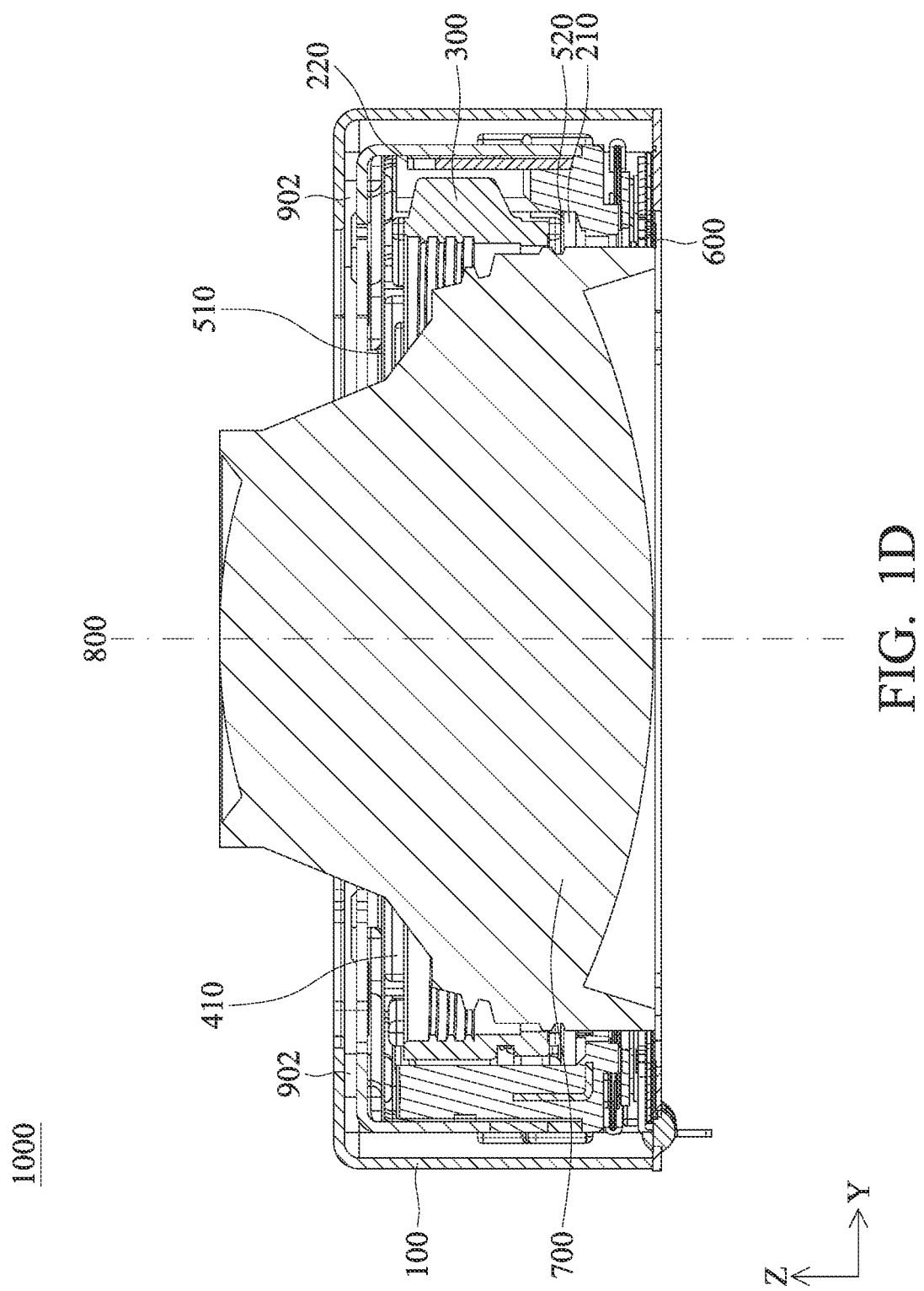
FIG. 1D is a cross-sectional view illustrated along the plane A-A in FIG. 1C.
Figure 1E:
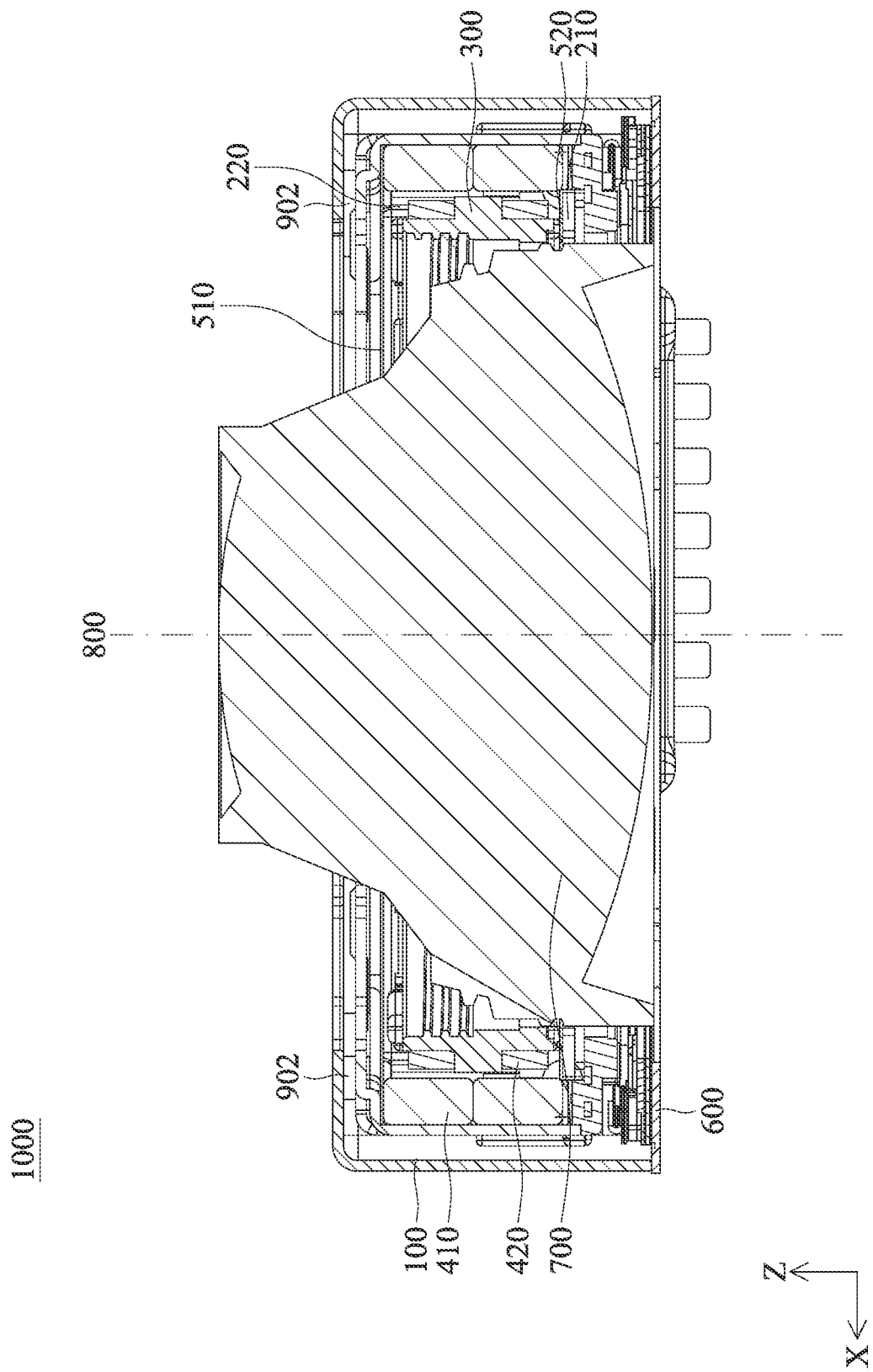
FIG. 1E is a cross-sectional view illustrated along the plane B-B in FIG. 1C.
Figure 1F:
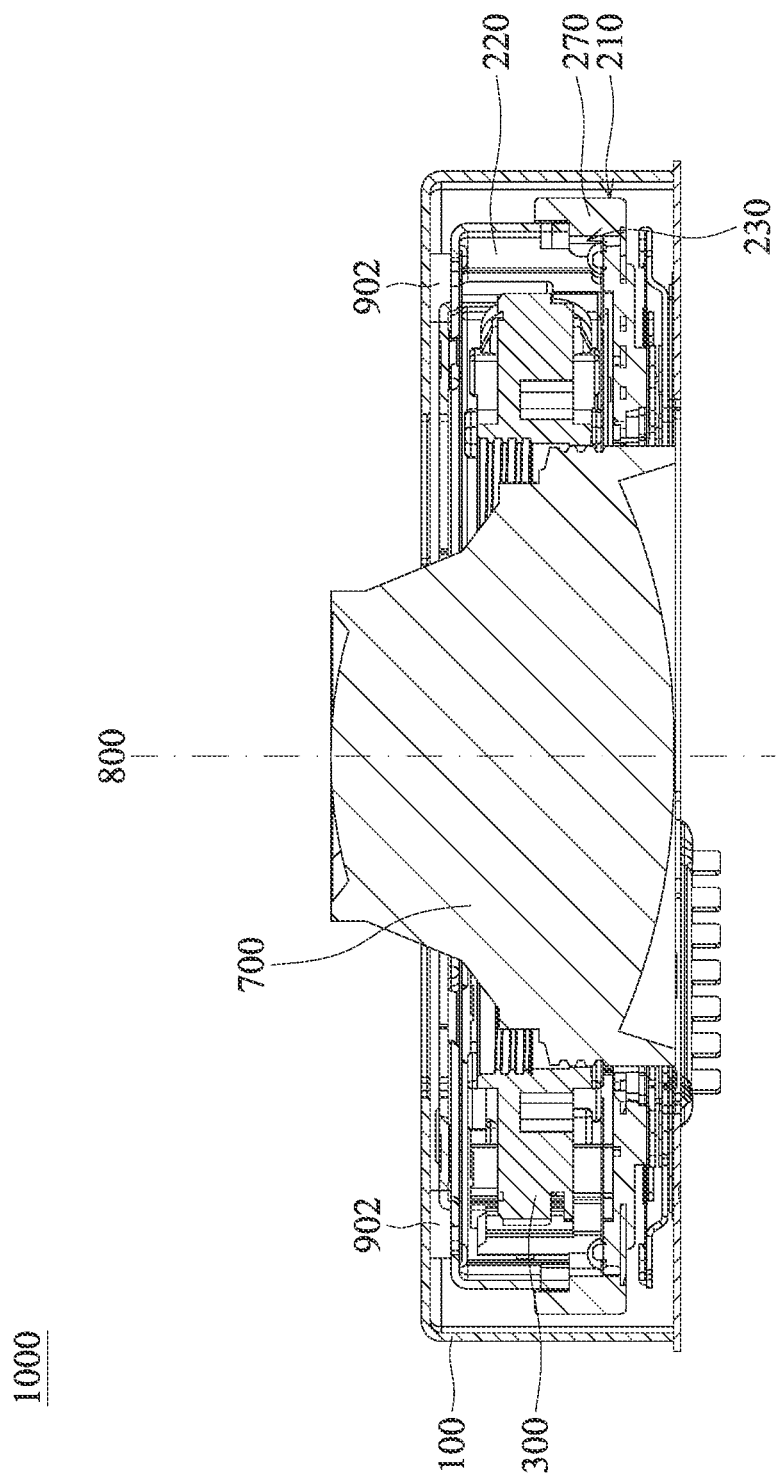
FIG. 1F is a cross-sectional view illustrated along the plane C-C in FIG. 1C.

Refer to FIG. 1A to FIG. 1F. FIG. 1A is a schematic view of an optical element driving mechanism 1000. FIG. 1B is an exploded view of the optical element driving mechanism 1000. FIG. 1C is a top view of the optical element driving mechanism 1000. FIG. 1D is a cross-sectional view illustrated along the plane A-A in FIG. 1C. FIG. 1E is a cross-sectional view illustrated along the plane B-B in FIG. 1C. FIG. 1F is a cross-sectional view illustrated along the plane C-C in FIG. 1C.

As shown in FIG. 1A to FIG. 1F, the optical element driving mechanism 1000 mainly may include a case 100, a first movable portion 200 (includes a bottom 210 and a frame 220), a holder 300, a first circuit element 310, a first driving assembly 400 (includes a first driving element 410 and a second driving element 420), a first resilient element 510, a second resilient element 520, and a second driving assembly 600 arranged along a main axis 800. The main axis 800 may extend along the Z direction, for example.

The optical element driving mechanism 1000 may be used for driving the optical element 700 to move to achieve auto focus (AF) or optical image stabilization (OIS). The optical element 700 may be a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the case 100 may be called as a fixed portion, and the second driving assembly 600 may be used for driving the first movable portion 200 to move relative to the fixed portion. The first driving assembly 400 may be used for driving the holder 300 and the optical element 700 to move relative to the fixed portion or the first movable portion 200 to achieve auto focus or optical image stabilization.

In some embodiments, a case opening and a bottom opening are formed on the case 100 and the bottom 210, respectively. The center of the case opening corresponds to a main axis 800 of the optical element 700, and the bottom opening corresponds to an image sensor (not shown) outside the optical element driving mechanism 1000. As a result, the optical element 700 disposed in the optical element driving mechanism 1000 can perform image focusing with the image sensor along the main axis 800.

The holder 300 has a through hole, and the optical element 700 may be fixed in the through hole. The second driving element 420 may be disposed on the outer surface of the holder 300. The first driving element 410 may be affixed on the frame 220.

The first circuit element 310 of the optical element driving mechanism 1000 may be a flexible printed circuit adhered on the bottom 210 of the optical element driving mechanism 1000. In this embodiment, the first circuit element 310 is electrically connected to other electronic elements disposed inside or outside the optical element driving mechanism 1000. For example, an electric signal may be transfer to the driving assembly through the first circuit element 310 to the first driving assembly 400 and the second driving assembly 600 to control the movement of the optical element 700 in the X, Y, or Z directions to achieve auto focus or optical image stabilization.

Specifically, a magnetic force may be created by the interaction between the first driving element 410 and the second driving element 420 to move the holder 300 along the direction of the main axis 800 relative to the frame 220 to achieve rapid focusing.

In some embodiments, the first driving assembly 400 may include a combination of magnets and coils, such as the first driving element 410 may be a magnet, and the second driving element 420 may be a coil. In this embodiment, the holder 300 and the optical element 700 disposed therein are movably disposed in the frame 220. More specifically, the holder 300 may be connected to and suspended in the frame 220 by the first resilient element 510 and the second resilient element 520 made of a metal material, for example (FIG. 1C). When current is applied to the second driving element 420, the second driving element 420 can act with the magnetic field of the first driving element 410 to generate an electromagnetic force to move the holder 300 and the optical element 700 along the main axis 800 relative to the frame 220 to achieve auto focusing. In some embodiments, the first driving assembly 400 may include other driving elements, such as piezoelectric elements or shape memory alloy elements.

In some embodiments, additional circuits (e.g. the second circuit element 320 described later) may be provided on the bottom 210 and electrically connects to electronic elements disposed inside or outside the optical element driving mechanism 1000 for achieve auto focus or optical image stabilization.

The circuits on the bottom 210 may transfer electrical signal to the second driving element 420 through the first resilient element 510 or the second resilient element 520 to control the movement of the holder 300 in X, Y, or Z directions.

The second resilient element 520 may be assembled with the circuits on the bottom 210 by soldering or laser welding to allow the second driving element 420 connecting to external circuits.

Figure 2A:
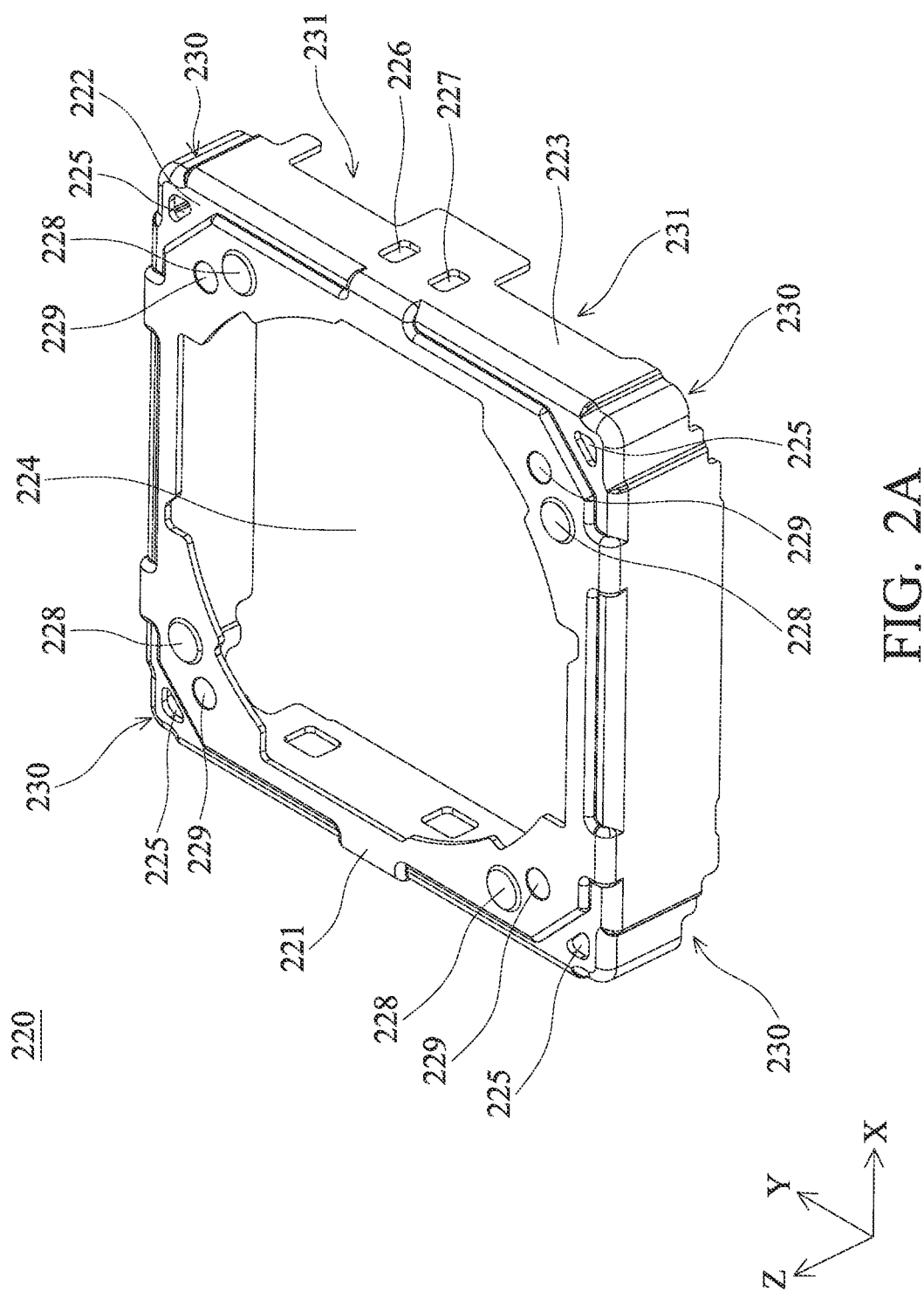
FIG. 2A is a schematic view of the frame.
Figure 2B:
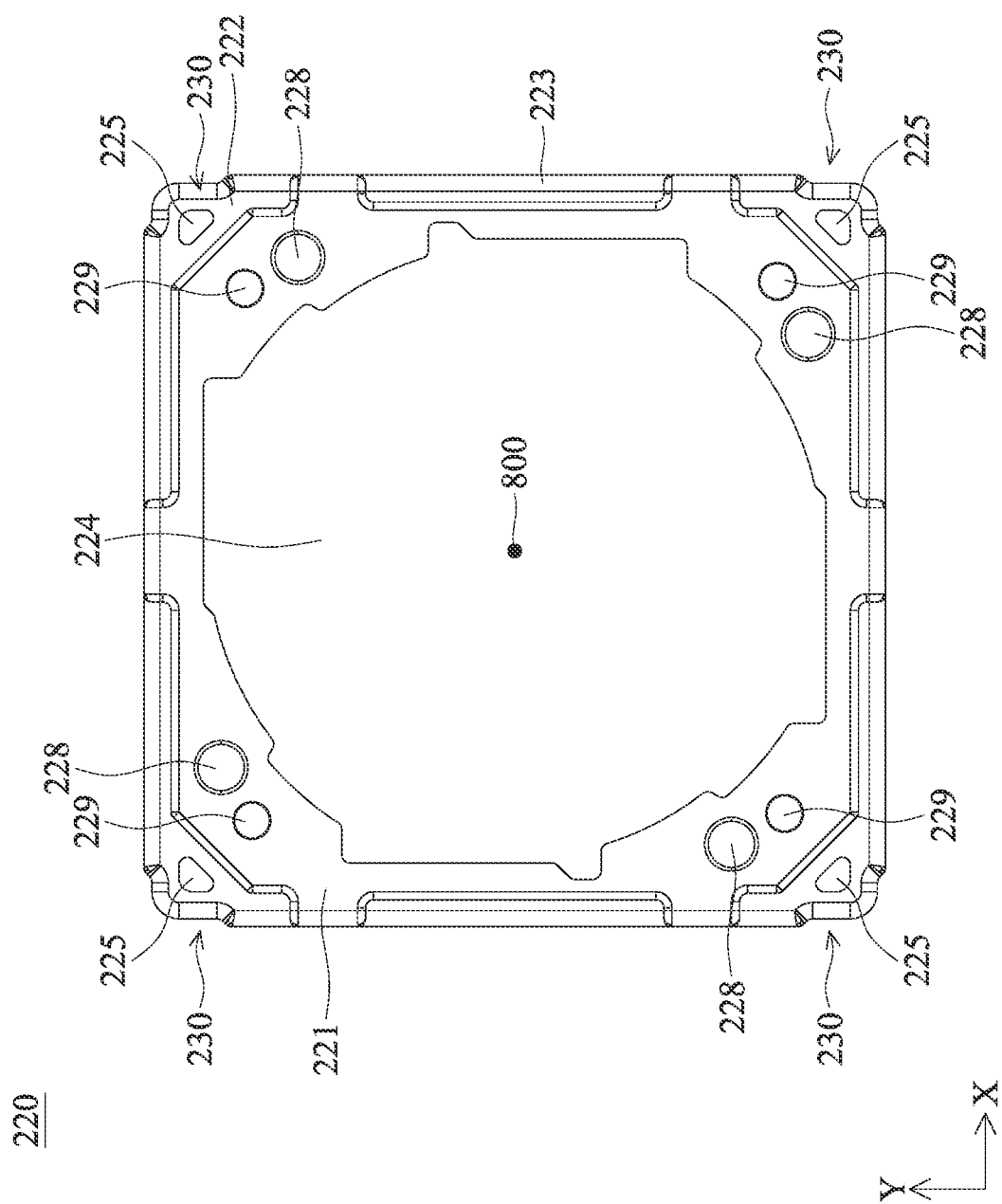
FIG. 2B is a top view of the frame.
Figure 2C:
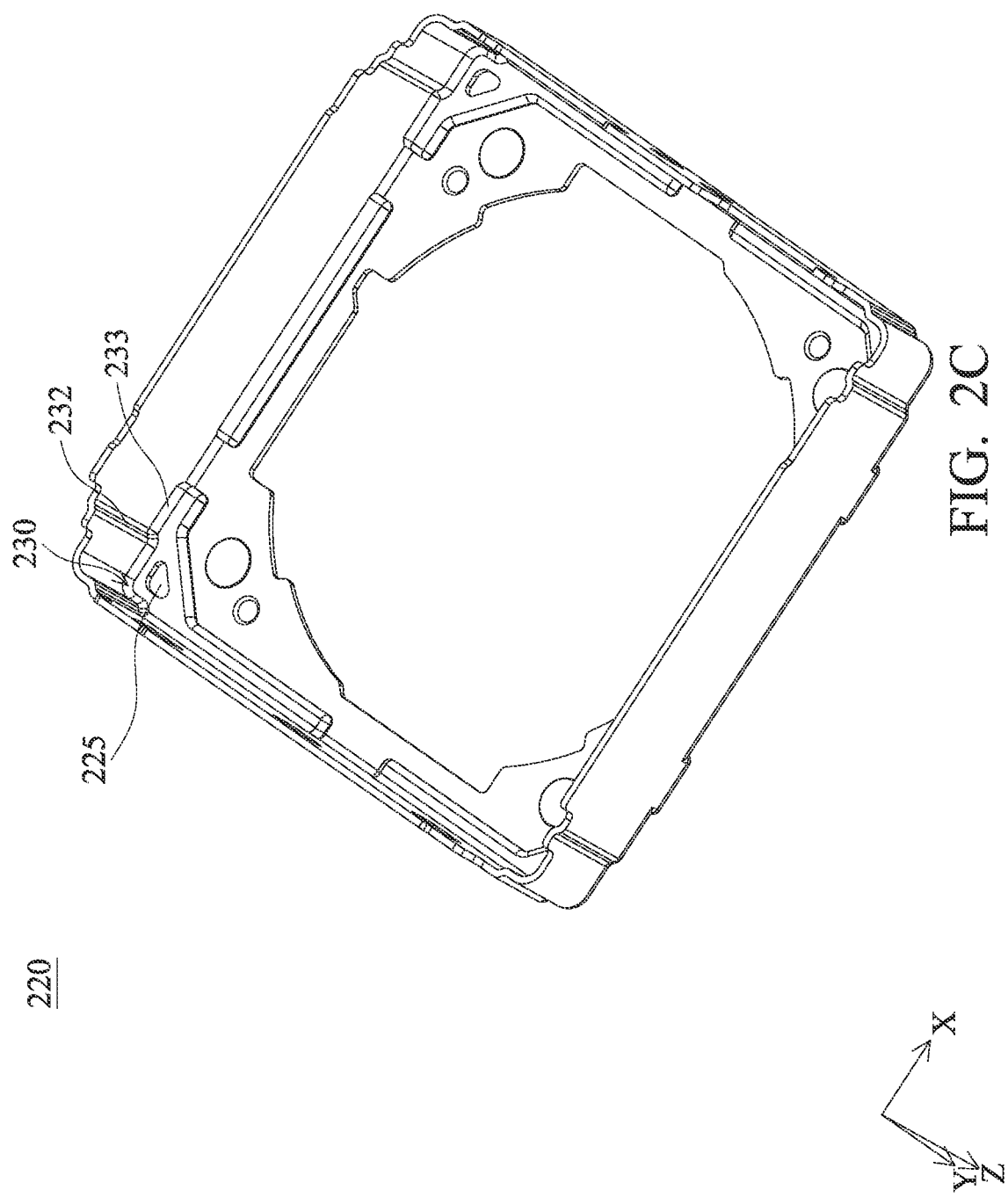
FIG. 2C is a schematic view of the frame.

FIG. 2A is a schematic view of the frame 220. FIG. 2B is a top view of the frame 220. FIG. 2C is a schematic view of the frame 220. As shown in FIG. 2A to FIG. 2C, the frame 220 may mainly include a first surface 221 and a second surface 222 that are substantially perpendicular to the main axis 800, and a third surface 223 that is substantially parallel to the main axis 800. The frame 220 may have a first opening 224 on the first surface 221, a second opening 225 on the second surface 222, and a third opening 226 and a fourth opening 227 on the third surface 223. In some embodiments, first protruding portion 228 and first concave portion 229 are formed on the first surface 221, and third concave portion 231 are formed on the third surface 223. Moreover, when viewed along the main axis 800, the bottom 210 and the frame 220 may be polygonal, and second concave portion 230 may be formed on the corners of the frame 220. The optical element 700 may be exposed from the first opening 224.

As shown in FIG. 2A to FIG. 2C, the first surface 221 and the second surface 222 do not intersect each other, such as they may position on different parallel planes. In some embodiments, the first protruding portion 228 protrudes from the first surface 221 in a direction that is away from the bottom 210 (e.g. the +Z direction), and the first concave portion 229 is concave toward to the bottom 210 (e.g. toward the −Z direction). Moreover, the second opening 225 may position at the corners of the frame 220. The second concave portion 230 is concave toward to a direction that is away from the bottom 210 (e.g. the +Z direction). Moreover, when viewed along the main axis 800, the second concave portion 230 is concave toward to the main axis 800. In other words, the second concave portion 230 is concave in the inner side of the frame 220.

In some embodiments, additional gel (not shown) may be provided on the first concave portion 229 to in contact with the first concave portion 229 and the case 100 at a same time to reduce resonance occurs when the optical element driving mechanism 1000 is operating.

Figure 3:
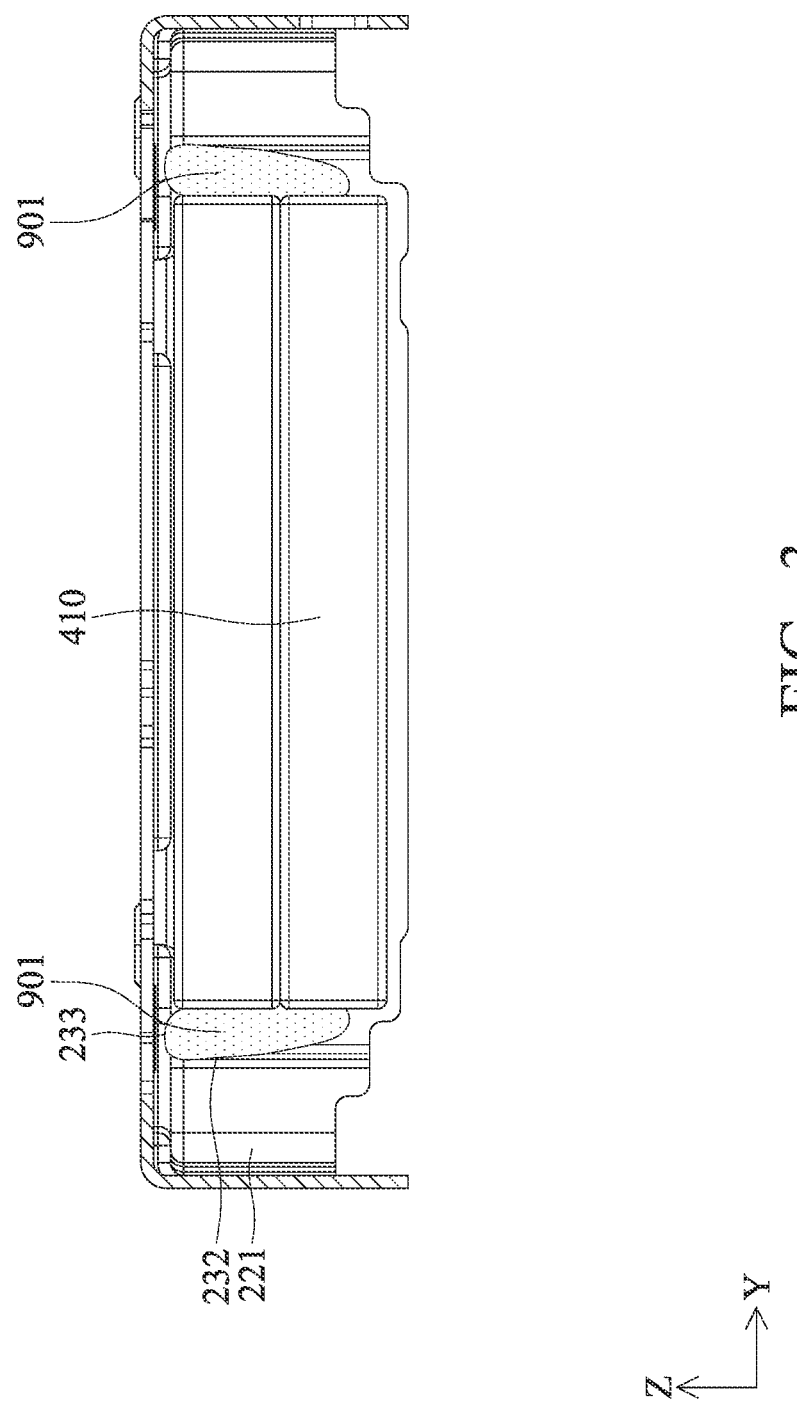
FIG. 3 is a schematic view of some elements of the optical element driving mechanism.

FIG. 3 is a schematic view of some elements of the optical element driving mechanism 1000, wherein the frame 220, the second driving element 420, and the first adhesive element 901 are mainly shown in FIG. 3. In some embodiments, as shown in FIG. 2C and FIG. 3, the second concave portion 230 of the frame 220 may have a fourth surface 232 and a fifth surface 233 at the back side of the frame 220. The fourth surface 232 may face toward the second driving element 420 and may be parallel to the main axis 800. In some embodiments, the fifth surface 233 may be adjacent to the fourth surface 232 and may be perpendicular to the main axis 800. The first adhesive element 901 may be in direct contact with the second driving element 420, the fourth surface 232, and the fifth surface 233 to increase the contact area, so the relative positions of the second driving element 420 and the frame 220 may be affixed.

Figure 4A:
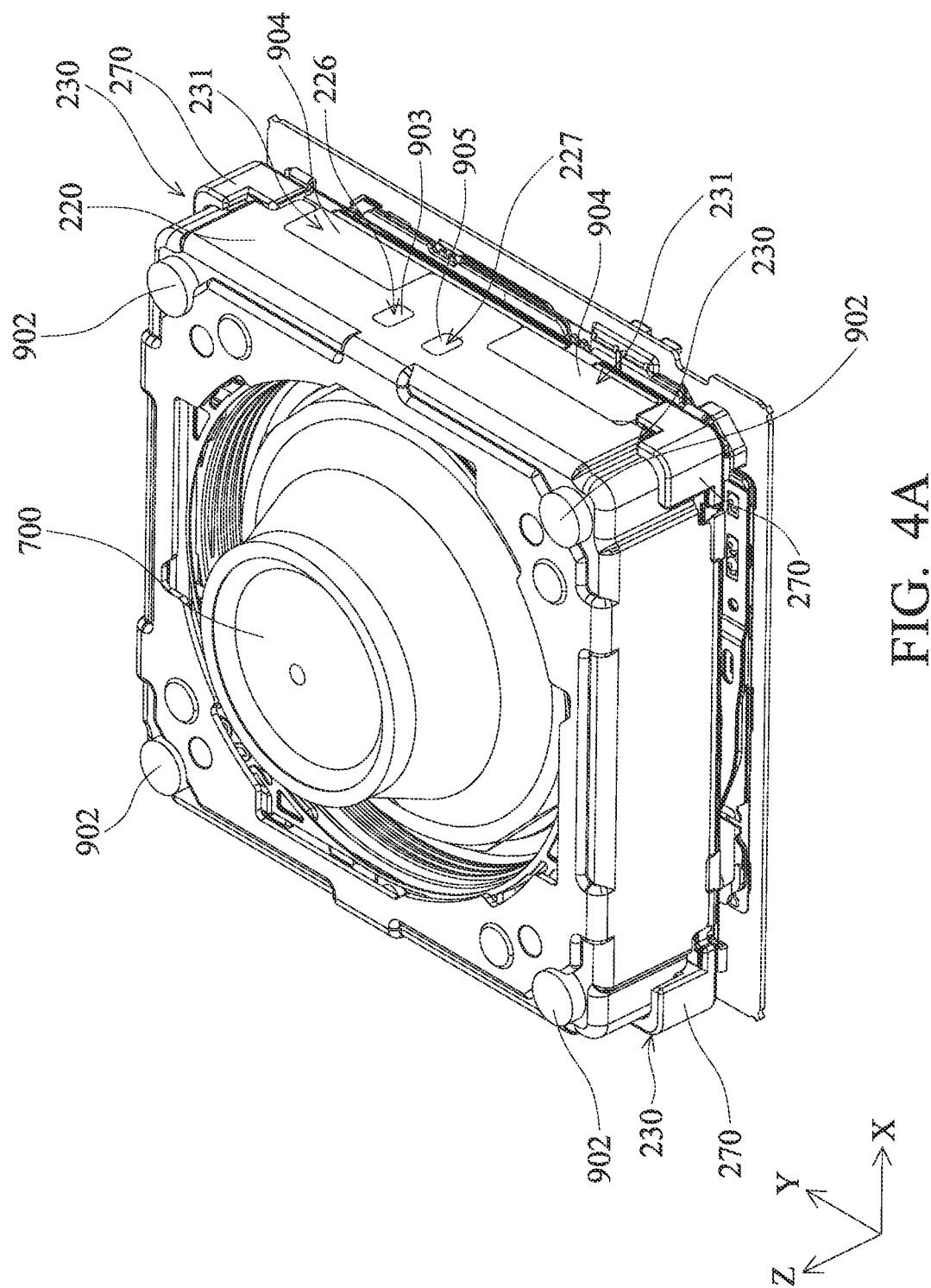
FIG. 4A and FIG. 4B is a schematic view of some elements of the optical element driving mechanism.
Figure 4B:
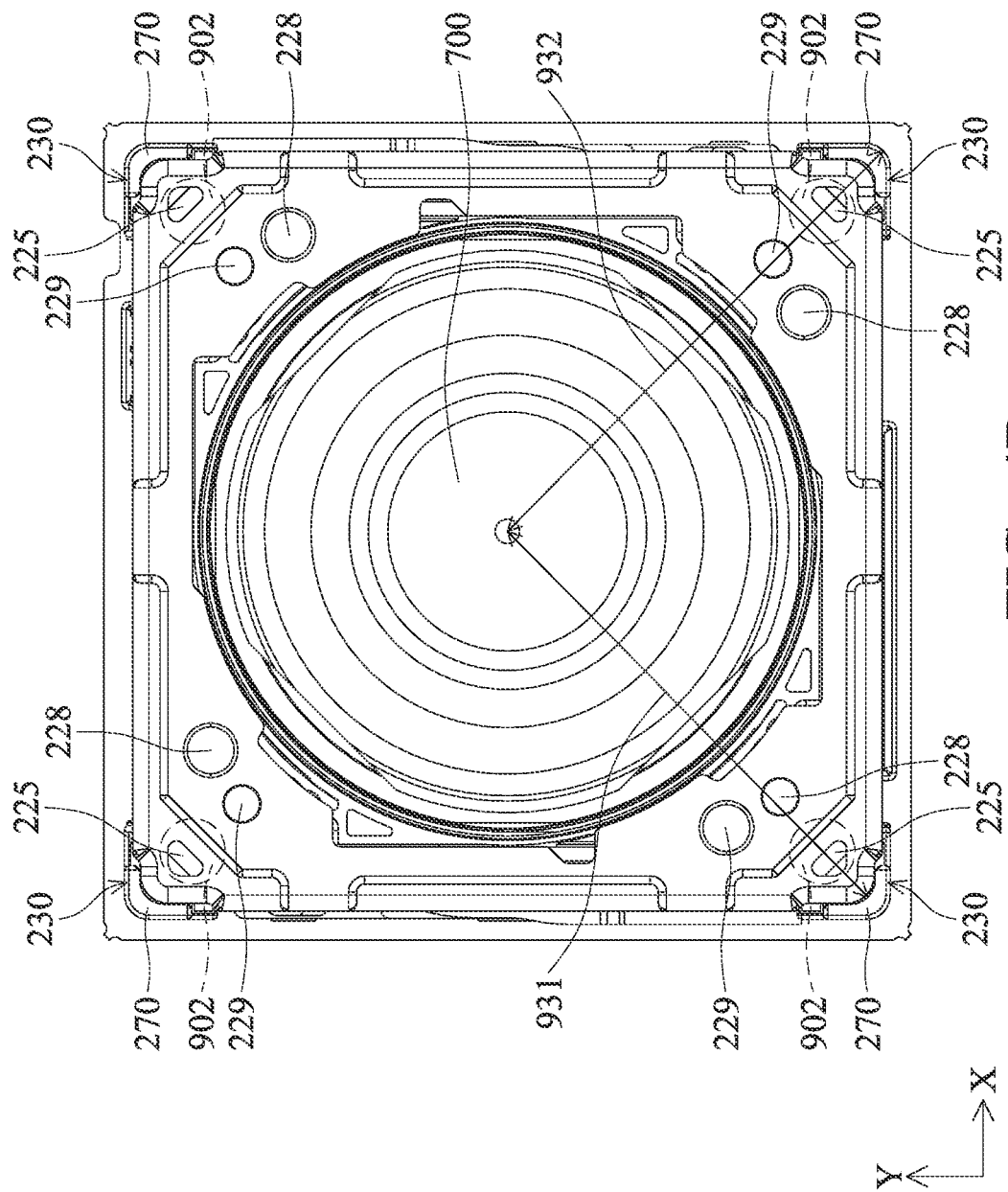

FIG. 4A and FIG. 4B is a schematic view of some elements of the optical element driving mechanism 1000, wherein the case 100 is omitted to show other elements underneath. In some embodiments, as shown in FIG. 4A and FIG. 4B, the bottom 210 may include first strengthening portion 270 position at the corners of the bottom 210. The first strengthening portions 270 correspond to the second concave portion 230 and extend in the main axis 800 (Z direction). For example, in a direction that is perpendicular to the main axis 800 (e.g. the X or Y direction), at least a portion of the first strengthening portion 270 may overlap the second concave portion 230. Moreover, as shown in FIG. 4B, when viewed along the main axis 800 (the main axis 800 looks as a point at this moment), the distance 931 between the second concave portion 230 and the main axis 800 is less than the distance 932 between the first strengthening portion 270 and the main axis 800. In other words, the first strengthening portion 270 is at the outer side of the optical element driving mechanism 1000 when compared with the second concave portion 230. Therefore, when the first movable portion 200 (includes the bottom 210 and the frame 220) moves relative to the case 100 (the fixed portion), the first strengthening portions 270 may be used for restricting the movable range of the frame 220, and other elements may be protected as well.

As shown in FIG. 4A and FIG. 4B, the optical element driving mechanism 1000 may further include a second adhesive element 902, a third adhesive element 903, a fourth adhesive element 904, and a fifth adhesive element 905 disposed on the frame 220. For example, the second adhesive element 902 may be in direct contact with the first surface 221 and the second surface 222 of the frame 220, and may be disposed on the second opening 225. For example, when viewed along the main axis 800, the second adhesive element 902 may fully cover the second opening 225. In some embodiments, the third adhesive element 903 may be disposed on the third opening 226, the fourth adhesive element 904 may be disposed on the third concave portion 231, and the fifth adhesive element 905 may be disposed on the fourth opening 227 and exposed from the frame 220. When viewed along the main axis 800, the second adhesive element 902 and the first protruding portion 228 do not overlap each other. In some embodiments, the second adhesive element 902 may be gel and may be in direct contact with the case 100 to reduce the resonance when the optical element driving mechanism 1000 is operating.

Figure 4C:
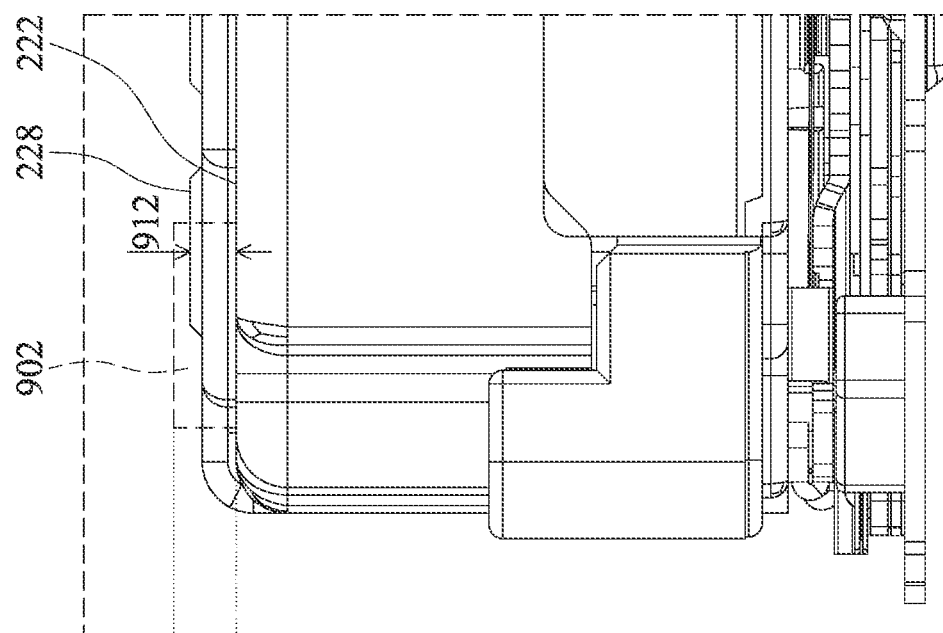
FIG. 4C is an enlarged side view of FIG. 4A.

FIG. 4C is an enlarged side view of FIG. 4A, wherein the first protruding portion 228 and the second adhesive element 902 are mainly shown. When viewed along a direction that is perpendicular to the main axis 800, the first height 911 of the second adhesive element 902 is different from the second height 912 of the first protruding portion 228 when calculated from the second surface 222, such as the first height 911 may be greater than the second height 912. When the frame 220 moves relative to the case 100, the first protruding portion 228 may be used for restricting the movable range of the frame 220. Therefore, the second adhesive element 902 may be prevented from withstanding excessive pressure. As shown in FIG. 4C, when viewed in a direction that is perpendicular to the main axis 800, at least a portion of the second adhesive element 902 overlaps the first protruding portion 228.

Figure 5A:
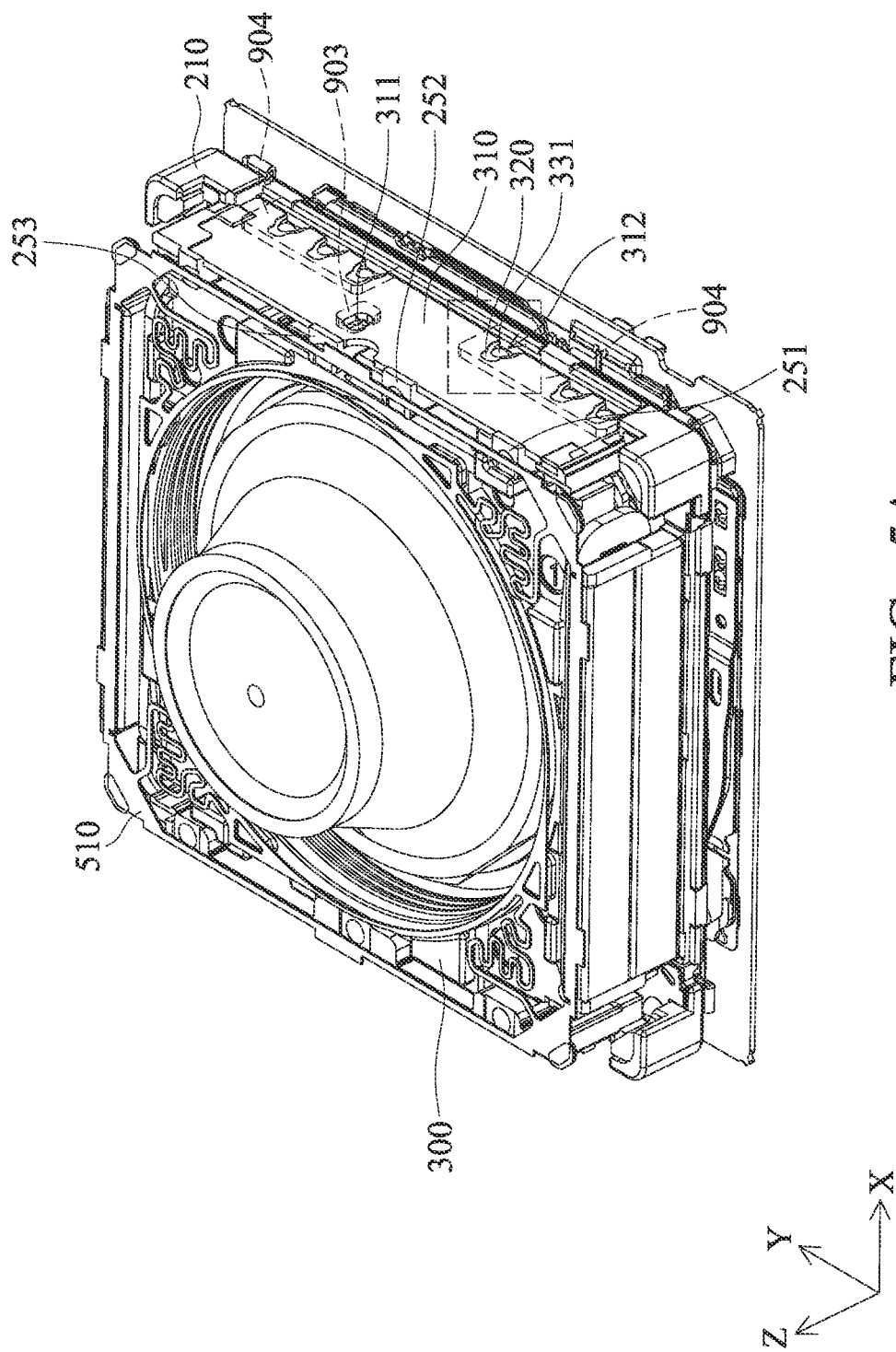
FIG. 5A is a schematic view of some elements of the optical element driving mechanism.
Figure 5B:
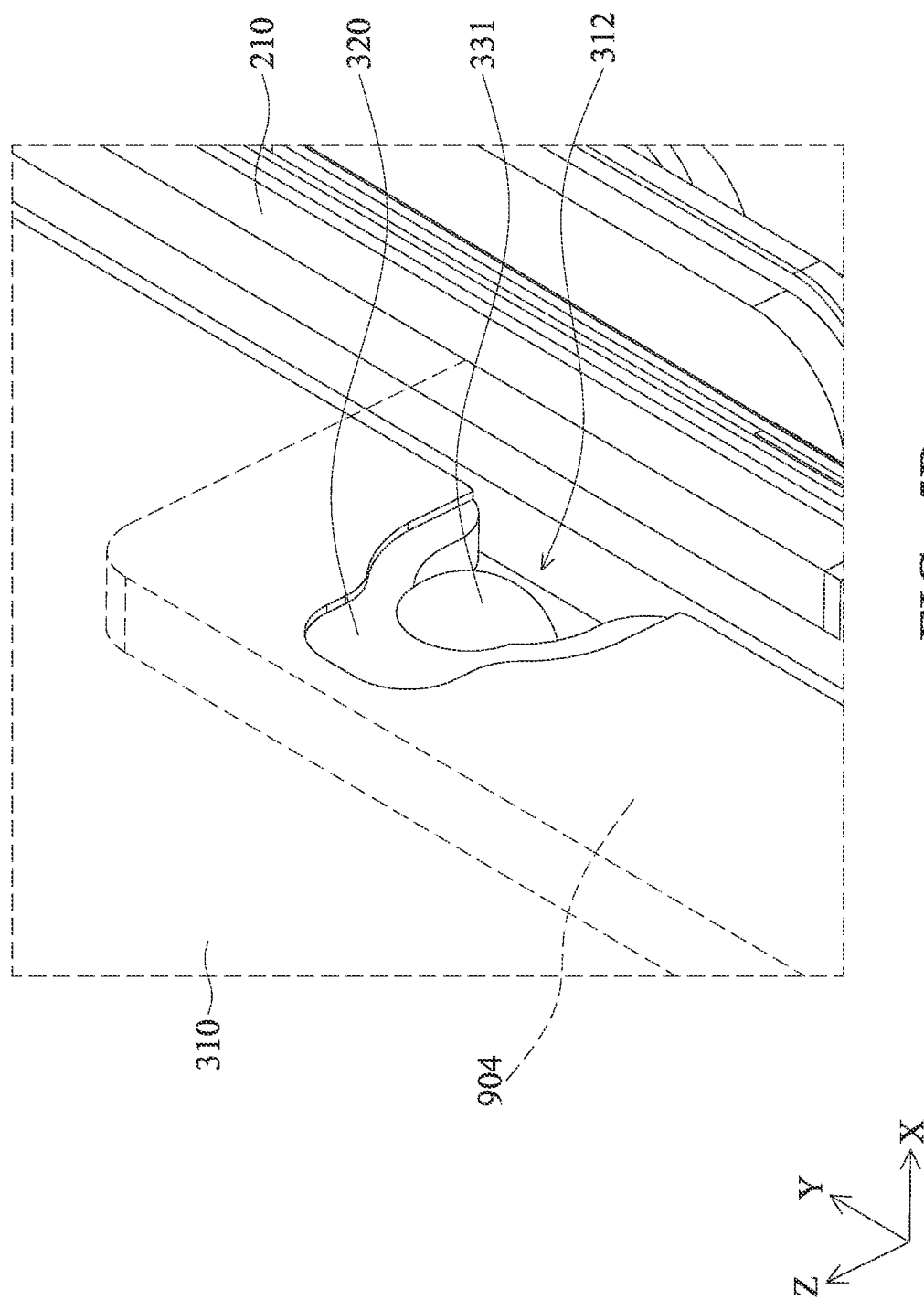
FIG. 5B is an enlarged view of FIG. 5A.
Figure 5C:
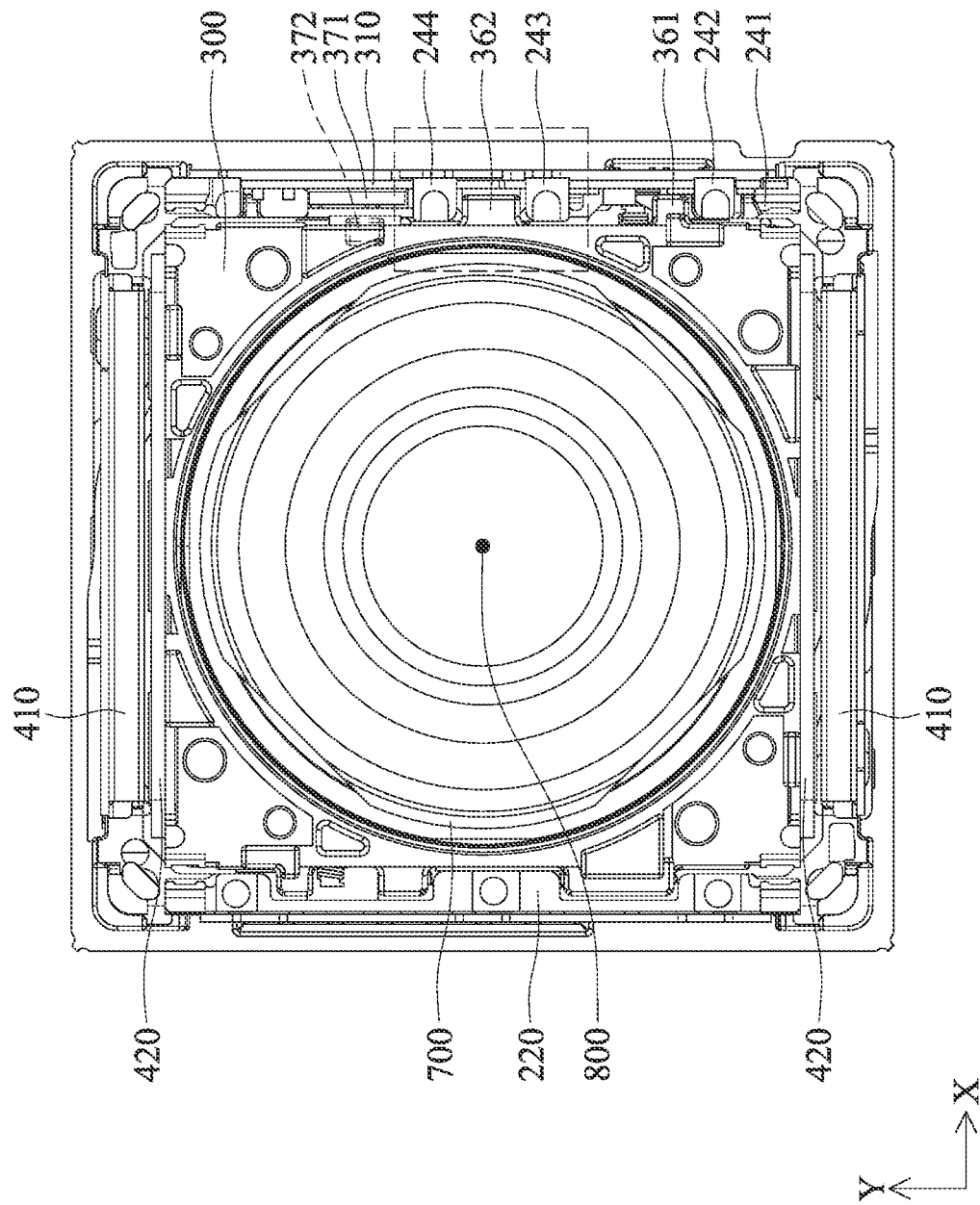
FIG. 5C is a top view of the elements in FIG. 5A.
Figure 5D:
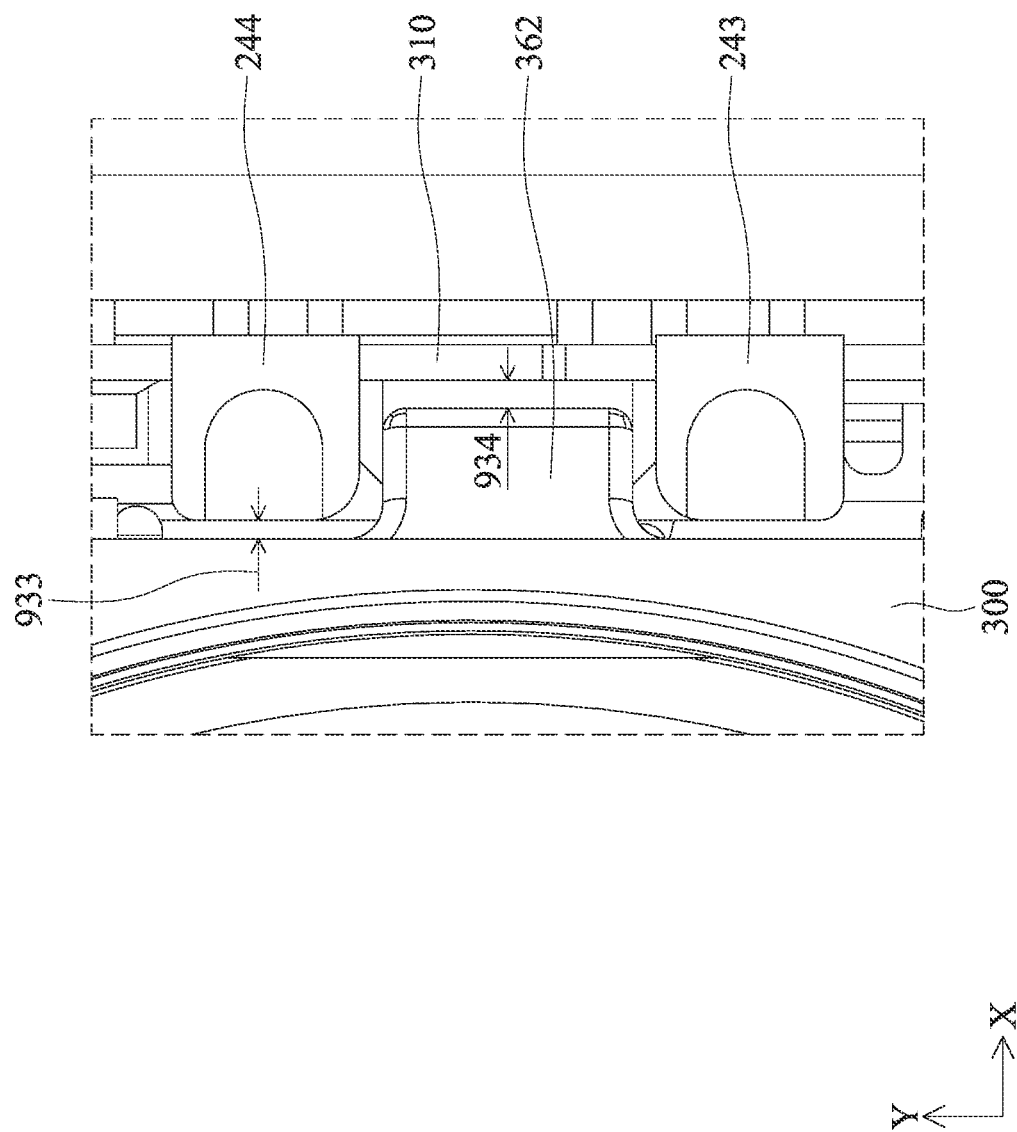
FIG. 5D is an enlarged view of FIG. 5C.
Figure 6A:
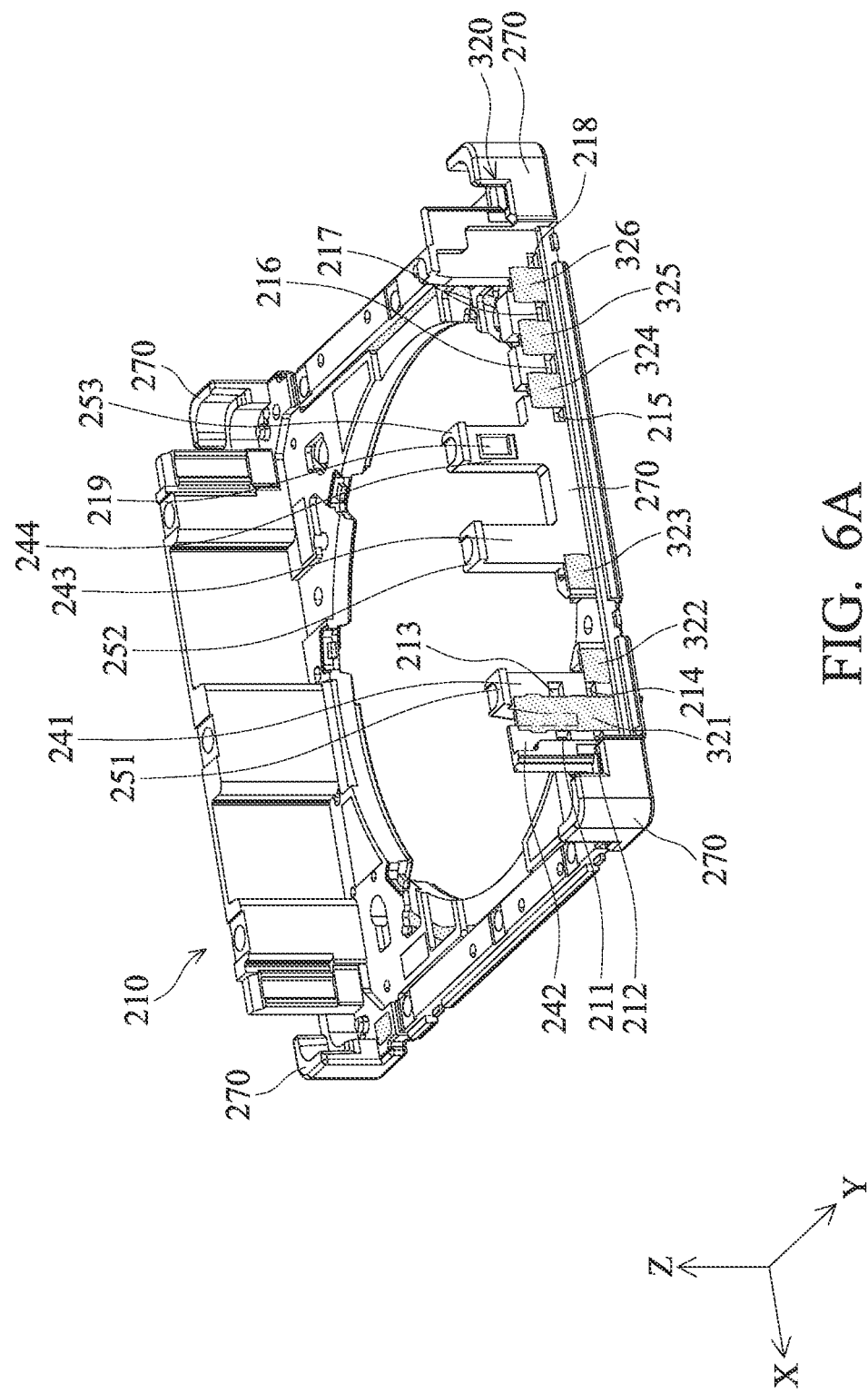
FIG. 6A and FIG. 6B are schematic views of the bottom and the second circuit element.
Figure 6B:
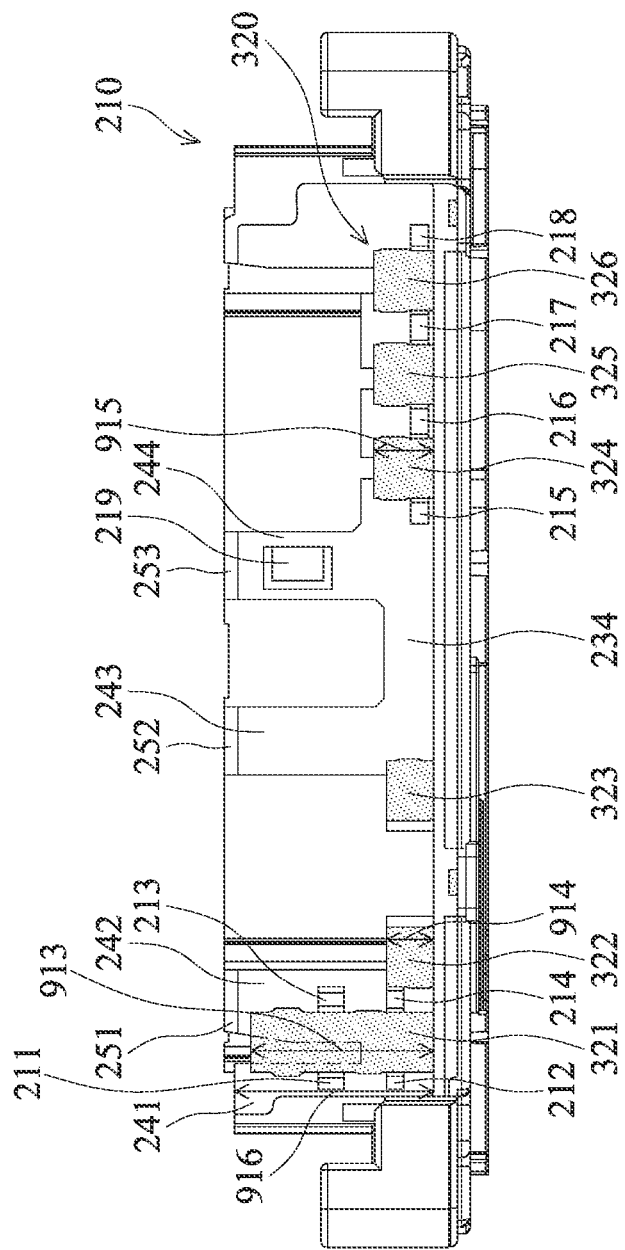

FIG. 5A is a schematic view of some elements of the optical element driving mechanism 1000, wherein the elements under the frame 220 are shown. FIG. 5B is an enlarged view of FIG. 5A. FIG. 5C is a top view of the elements in FIG. 5A. FIG. 5D is an enlarged view of FIG. 5C. FIG. 6A and FIG. 6B are schematic views of the bottom 210 and the second circuit element 320.

As shown in FIG. 5A to FIG. 6B, the first circuit element 310 and the second circuit element 320 may be disposed on the first movable portion 200 (e.g. the bottom 210), such as the second circuit element 320 may be embedded in the bottom 210, and a portion of the second circuit element 320 may be exposed from the second circuit element 320. The third adhesive element 903 and the fourth adhesive element 904 may be disposed on the first circuit element 310. For example, In some embodiments, the first circuit element 310 may include a fourth concave portion 312, and the second circuit element 320 may be partially exposed from the fourth concave portion 312. A first conductive element 331 (e.g. solder ball) may be provided on the fourth concave portion 312 to connect the first circuit element 310 and the second circuit element 320, so the first circuit element 310 and the second circuit element 320 may be electrically connect to each other at the fourth concave portion 312. In some embodiments, the fourth adhesive element 904 may cover the fourth concave portion 312 and the first conductive element 331 to protect the connecting point between the first circuit element 310 and the second circuit element 320. For example, when viewed in a direction that is perpendicular to the main axis 800, at least a portion of the fourth adhesive element 904 overlaps the first conductive element 331 and the fourth concave portion 312. In a direction that is perpendicular to the main axis 800, at least a portion of the first circuit element 310 and the second circuit element 320 overlap each other.

The bottom 210 may include a sixth surface 234 facing the first circuit element 310. A first recess 211, a second recess 212, a third recess 213, a fourth recess 214, a fifth recess 215, a sixth recess 216, a seventh recess 217, an eighth recess 218, and a ninth recess 219 may be formed on the sixth surface 234. Moreover, the bottom 210 may further include a first supporting portion 241, a second supporting portion 242, a third supporting portion 243, and a fourth supporting portion 244 extending in the main axis 800. In some embodiments, the bottom 210 may further include a first extending portion 251, a second extending portion 252, and a third extending portion 253. The first extending portion 251 is position at the second supporting portion 242 and extending in a direction that is perpendicular to the main axis 800. The second extending portion 252 is position at the third supporting portion 243 and extending in a direction that is perpendicular to the main axis 800. The third extending portion 253 is position at the fourth supporting portion 244 and extending in a direction that is perpendicular to the main axis 800. In other words, the first supporting portion 241, the second supporting portion 242, the third supporting portion 243, and the fourth supporting portion 244 extending in a direction that is different from the direction that the first extending portion 251, the second extending portion 252, and the third extending portion 253 extends. The sixth surface 234 may be the surface of the first supporting portion 241, the second supporting portion 242, the third supporting portion 243, and the fourth supporting portion 244. The first recess 211, the second recess 212, the third recess 213, the fourth recess 214, the fifth recess 215, the sixth recess 216, the seventh recess 217, and the eighth recess 218 may be used for defining the position of the second circuit element 320 relative to the bottom 210, such as may act as reference points, to prevent undesired relative position between the second circuit element 320 and the bottom 210.

In some embodiments, the second concave portion 230 may include a first circuit unit 321, a second circuit unit 322, a third circuit unit 323, a fourth circuit unit 324, a fifth circuit unit 325, and a sixth circuit unit 326 disposed on the sixth surface 234 of the bottom 210 and are exposed from the sixth surface 234. In some embodiments, when viewed in a direction that is perpendicular to the main axis 800, the first recess 211, the second recess 212, the third recess 213, and the fourth recess 214 are adjacent to the first circuit element 310. The first recess 211 and the third recess 213 are at opposite sides of the first circuit unit 321. The first recess 211 and the third recess 213 are arranged in a direction that is perpendicular to the main axis 800. The second recess 212 and the fourth recess 214 are at opposite sides of the first circuit unit 321. The second recess 212 and the fourth recess 214 are arranged in a direction that is perpendicular to the main axis 800. The first recess 211 and the second recess 212 are arranged in a direction that is parallel to the main axis 800. The third recess 213 and the fourth recess 214 are arranged in a direction that is parallel to the main axis 800. The third circuit unit 323 may position between the second circuit unit 322 and the fourth circuit unit 324.

In some embodiments, in the direction that the main axis 800 extends, the first circuit unit 321 has a third height 913, the second circuit unit 322 has a fourth height 914, the fourth circuit unit 324 has a fifth height 915, and the first supporting portion 241 has a sixth height 916. The third height 913 is different from the fourth height 914, the fifth height 915, and the sixth height 916, such as the third height 913 may be greater than the fourth height 914 and the fifth height 915, and less than the sixth height 916. In some embodiments, the first circuit unit 321 may be between the first supporting portion 241 and the second supporting portion 242 to further increase the mechanical strength of the first supporting portion 241 and the second supporting portion 242.

In some embodiments, the fifth recess 215, the sixth recess 216, the seventh recess 217, and the eighth recess 218 may arrange in a direction that is perpendicular to the main axis 800. The fourth recess 214 may be adjacent to the second circuit unit 322. The fourth circuit unit 324 may be between the fifth recess 215 and the sixth recess 216. The fifth circuit unit 325 may be between the sixth recess 216 and the seventh recess 217. The sixth circuit unit 326 may be between the seventh recess 217 and the eighth recess 218. The ninth recess 219 may be position at the fourth supporting portion 244. In some embodiments, the first extending portion 251, the second extending portion 252, and the third extending portion 253 may be in direct contact with the first circuit element 310, and the first circuit element 310 may be in direct contact with the sixth surface 234 to define the position of the first circuit element 310. For example, the first extending portion 251, the second extending portion 252, and the third extending portion 253 may arrange with the first circuit element 310 in the direction that the main axis 800 extends to prevent the first circuit element 310 to move in the Z direction.

As shown in FIG. 5C and FIG. 5D, when viewed along the main axis 800, the holder 300 may further include a first stopping portion 361 and a second stopping portion 362 extending in a direction that is perpendicular to the main axis 800. The first stopping portion 361 is between the second supporting portion 242 and the third supporting portion 243, and the second stopping portion 362 is between the third supporting portion 243 and the fourth supporting portion 244. The first stopping portion 361 and the second stopping portion 362 may be used for restrict the position of the movable range of the holder 300 in the Y direction with the first supporting portion 241, the second supporting portion 242, the third supporting portion 243, and the fourth supporting portion 244. In some embodiments, in a direction that is perpendicular to the main axis 800, the distance 934 between the holder 300 and the fourth supporting portion 244 is less than the distance 933 between the second stopping portion 362 and the first circuit element 310. Therefore, the holder 300 may be preventing from in direct contact with the first circuit element 310 when the holder 300 is moving.

In some embodiments, a sensing element 371 may be disposed on the bottom 210 or the frame 220, and a corresponding sensing magnetic element 372 may be disposed on the holder 300 to detect the position of the holder 300 relative to the bottom 210 or the frame 220. In some embodiments, the sensing element 371 may at least partially overlap the sensing magnetic element 372 in a direction that is perpendicular to the main axis 800. In some embodiments, the sensing element 371 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

FIG. 6C is an enlarged cross-sectional view of the optical element driving mechanism 1000. The first circuit element 310 may further include a fifth opening 311, and the fifth opening 311 is at least partially overlapping the third opening 226 of the frame 220 in a direction that is perpendicular to the main axis 800. The third adhesive element 903 may be disposed in the third opening 226 and the fifth opening 311, may be disposed between the first circuit element 310 and the bottom 210, and may be disposed in the ninth recess 219. When viewed in a direction that is perpendicular to the main axis 800, at least a portion of the frame 220 is exposed from the fifth opening 311, and the second adhesive element 902 covers the fifth opening 311.

In some embodiments, when viewed along a direction that is perpendicular to the main axis 800, between the first circuit element 310 and the bottom 210, the third adhesive element 903 may include third width 923, the ninth recess 219 may include a fourth width 924, and the fifth opening 311 may include a fifth surface 925 in the direction that the main axis 800 extends. The third width 923 may be greater than the fourth width 924 and the fifth width 925. Therefore, the third adhesive element 903 may include a structure that likes a hook to further affix the relative positions between the bottom 210, the frame 220, and the first circuit element 310.

Figure 7A:
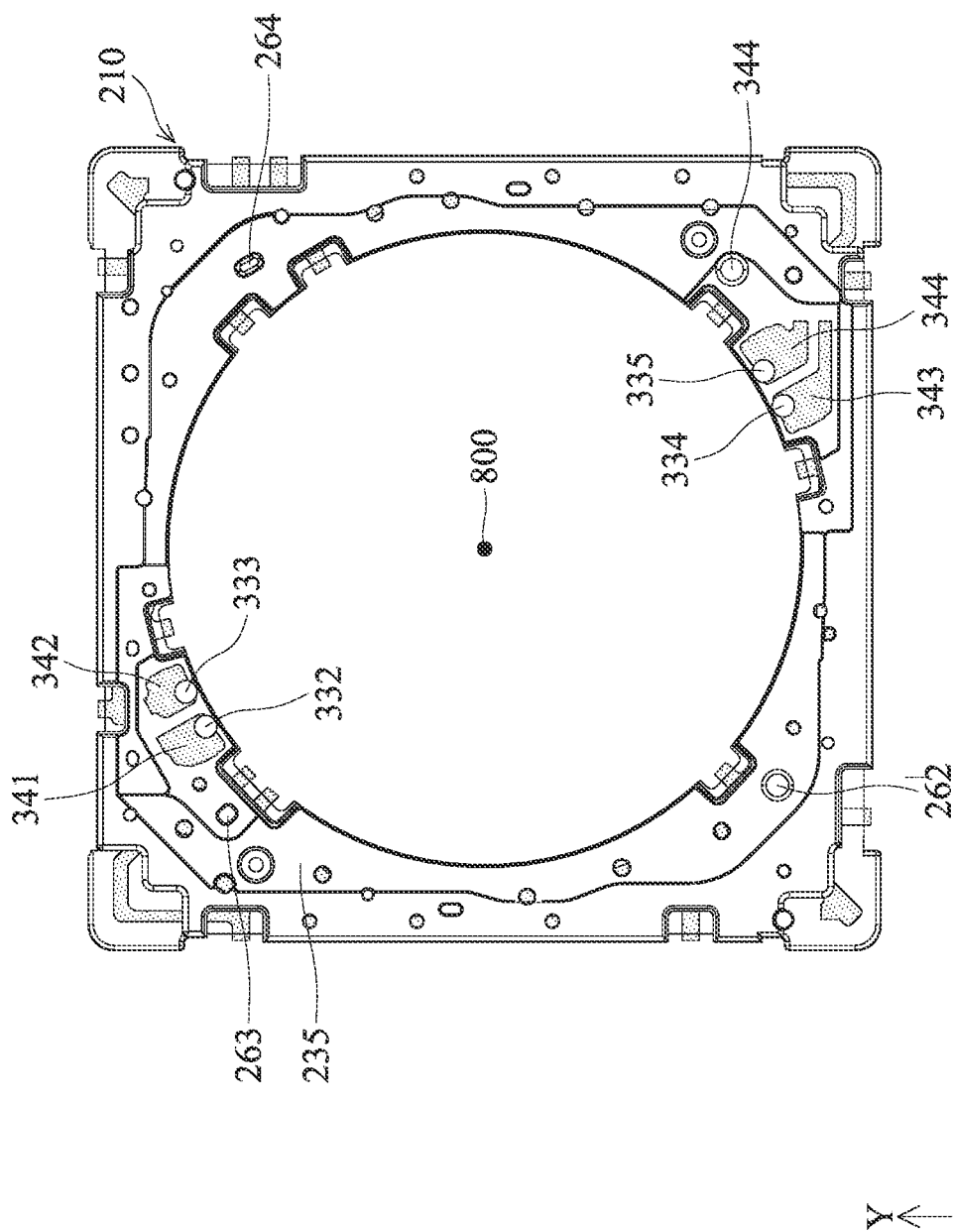
FIG. 7A is a bottom view of the bottom and the second circuit element.

FIG. 7A is a bottom view of the bottom 210 and the second circuit element 320. The bottom 210 may further include a fifth opening 261, a sixth opening 262, a seventh opening 263, and a eighth opening 264 disposed on a seventh surface 235 of the bottom 210. The seventh surface 235 may be perpendicular to the main axis 800 and may face away from the case 100 (the fixed portion). In some embodiments, the second circuit element 320 may further include a first electrical contact 341, a second electrical contact 342, a third electrical contact 343, and a fourth electrical contact 344 that are exposed from the seventh surface 235.

In some embodiments, the optical element driving mechanism 1000 may further include a second conductive element 332, a third conductive element 333, a fourth conductive element 334, and a fifth conductive element 335 disposed on the first electrical contact 341, the second electrical contact 342, the third electrical contact 343, and the fourth electrical contact 344, respectively. For example, the second conductive element 332, the third conductive element 333, the fourth conductive element 334, and the fifth conductive element 335 may at least partially overlap and electrically connected to the first electrical contact 341, the second electrical contact 342, the third electrical contact 343, and the fourth electrical contact 344, respectively.

In some embodiments, when viewed along the main axis 800, the first electrical contact 341, the second electrical contact 342, the third electrical contact 343, and the fourth electrical contact 344 at least partially exposed from the second conductive element 332, the third conductive element 333, the fourth conductive element 334, and the fifth conductive element 335, respectively. In other words, the second conductive element 332, the third conductive element 333, the fourth conductive element 334, and the fifth conductive element 335 are not fully covered by the first electrical contact 341, the second electrical contact 342, the third electrical contact 343, and the fourth electrical contact 344. Therefore, the first electrical contact 341, the second electrical contact 342, the third electrical contact 343, and the fourth electrical contact 344 of the second circuit element 320 may be electrically connected to other elements through the second conductive element 332, the third conductive element 333, the fourth conductive element 334, and the fifth conductive element 335, respectively.

In some embodiments, as shown in FIG. 7A, the second conductive element 332 and the third conductive element 333 is position at an opposite side of the main axis 800 with respect to the fourth conductive element 334 and the fifth conductive element 335. The shapes of the fifth opening 261 and the sixth opening 262 are different from the shapes of the seventh opening 263 and the eighth opening 264. For example, the fifth opening 261 and the sixth opening 262 may be circular, and the seventh opening 263 and the eighth opening 264 may be strip-shaped.

Figure 7B:
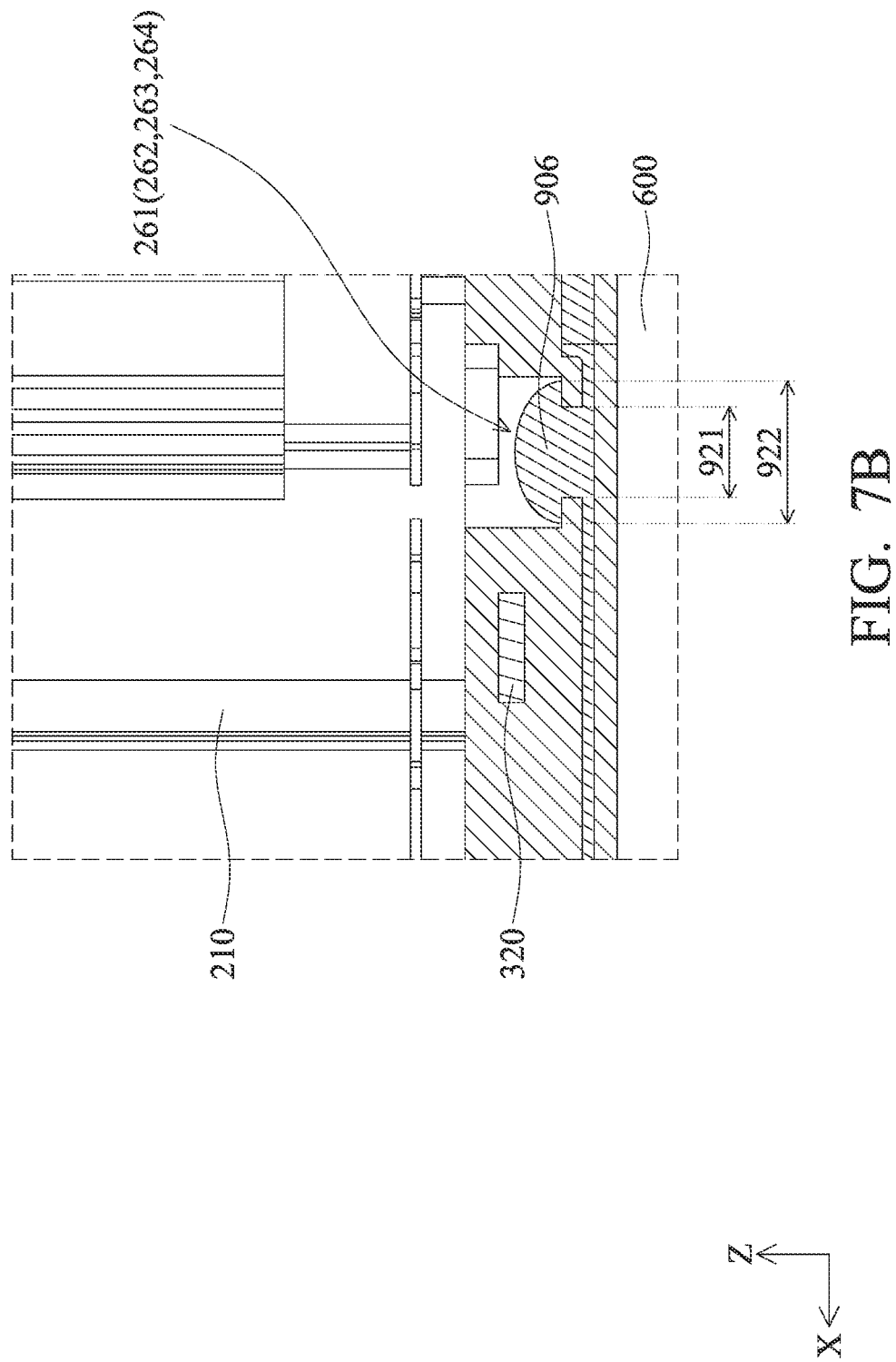
FIG. 7B is a cross-sectional view of some elements of the optical element driving mechanism.

FIG. 7B is a cross-sectional view of some elements of the optical element driving mechanism 1000, wherein the details close to the fifth opening 261 (or the sixth opening 262, the seventh opening 263, the eighth opening 264) are shown. As shown in FIG. 7B, a sixth adhesive element 906 may be disposed between the second driving assembly 600 and the bottom 210 to affix the relative position between the second driving assembly 600 and the bottom 210. For example, In some embodiments, when viewed in a direction that is perpendicular to the main axis 800, the minimum dimension of the fifth opening 261 is a first width 921. A portion of the sixth adhesive element 906 may be disposed in the fifth opening 261 and has a second width 922, and the second width 922 is greater than the first width 921. Therefore, the sixth adhesive element 906 may have a shape like a hook to further affix the second driving assembly 600 and the bottom 210. In some embodiments, the sixth opening 262, the seventh opening 263, the eighth opening 264, and the sixth adhesive element 906 may have similar relationship, and it is not repeated.

Figure 8A:
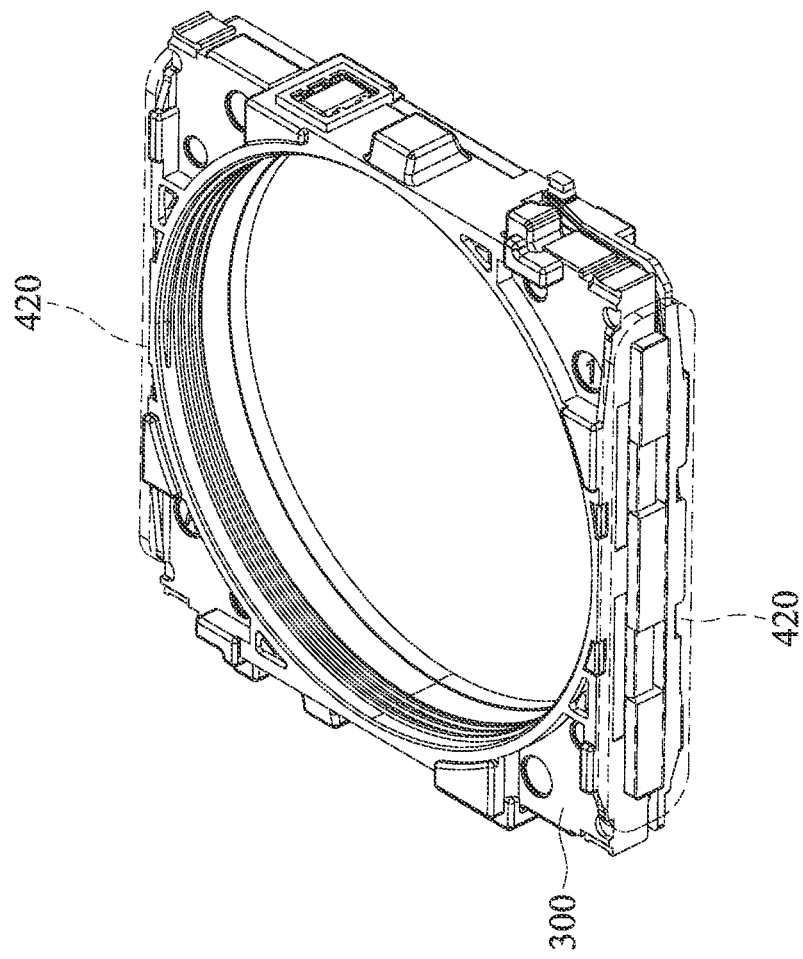
FIG. 8A, FIG. 8B, and FIG. 8C are schematic views of the holder and the second driving element viewed in different directions.
Figure 8B:
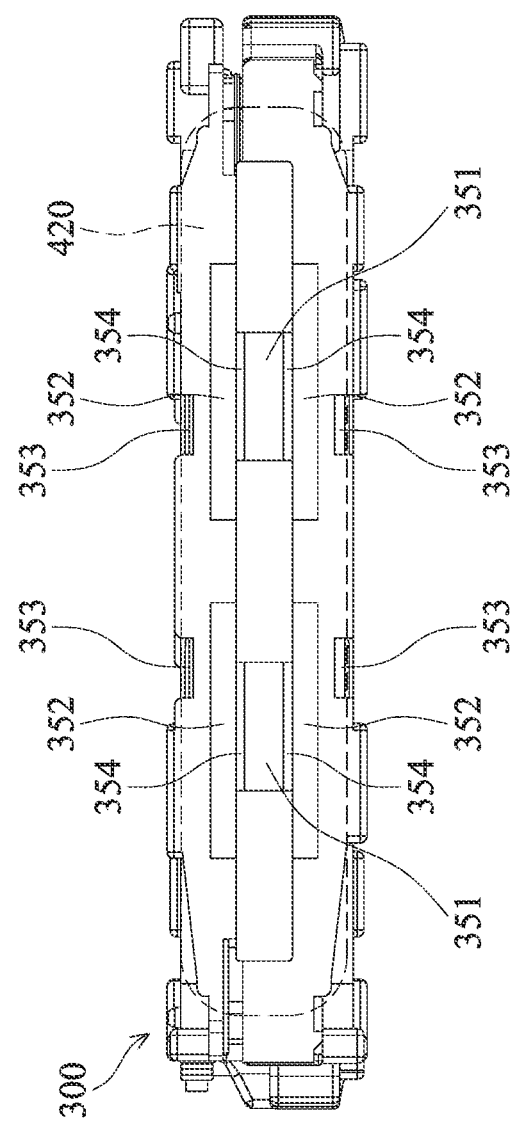
Figure 8C:
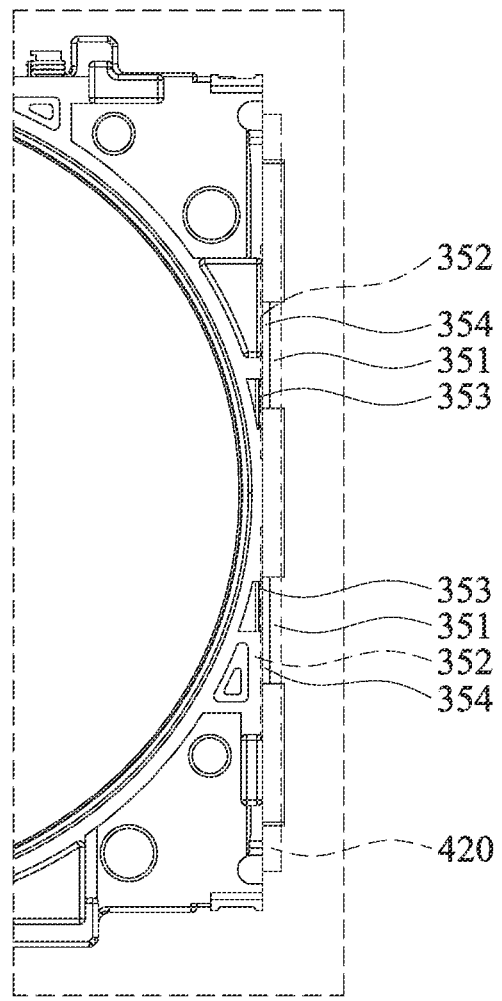

FIG. 8A, FIG. 8B, and FIG. 8C are schematic views of the holder 300 and the second driving element 420 viewed in different directions. As shown in FIG. 8A to FIG. 8C, the holder 300 include a first holder recess 351, a second holder recess 352, a third holder recess 353, and a tilted surface 354. The first holder recess 351 is exposed from the second driving element 420. The second holder recess 352 and the third holder recess 353 at least partially overlap the second driving element 420. The tilted surface 354 is between the first holder recess 351 and the second holder recess 352. When viewed along the main axis 800, the first holder recess 351 and the second holder recess 352 at least partially overlap the second driving element 420, and the third holder recess 353 is exposed from the second driving element 420. When viewed along a direction that is perpendicular to the main axis 800, the tilted surface 354 is exposed from the second driving element 420. By providing a plurality of holder recesses, additional adhesive elements (e.g. glue) may be provided in the holder recesses to prevent the problem that the second driving element 420 becomes loosened when the second driving element 420 is a coil. The tilted surface 354 may allow the glue further flow to the holder recesses to further prevent the second driving element 420 becoming loosened.

Figure 9:
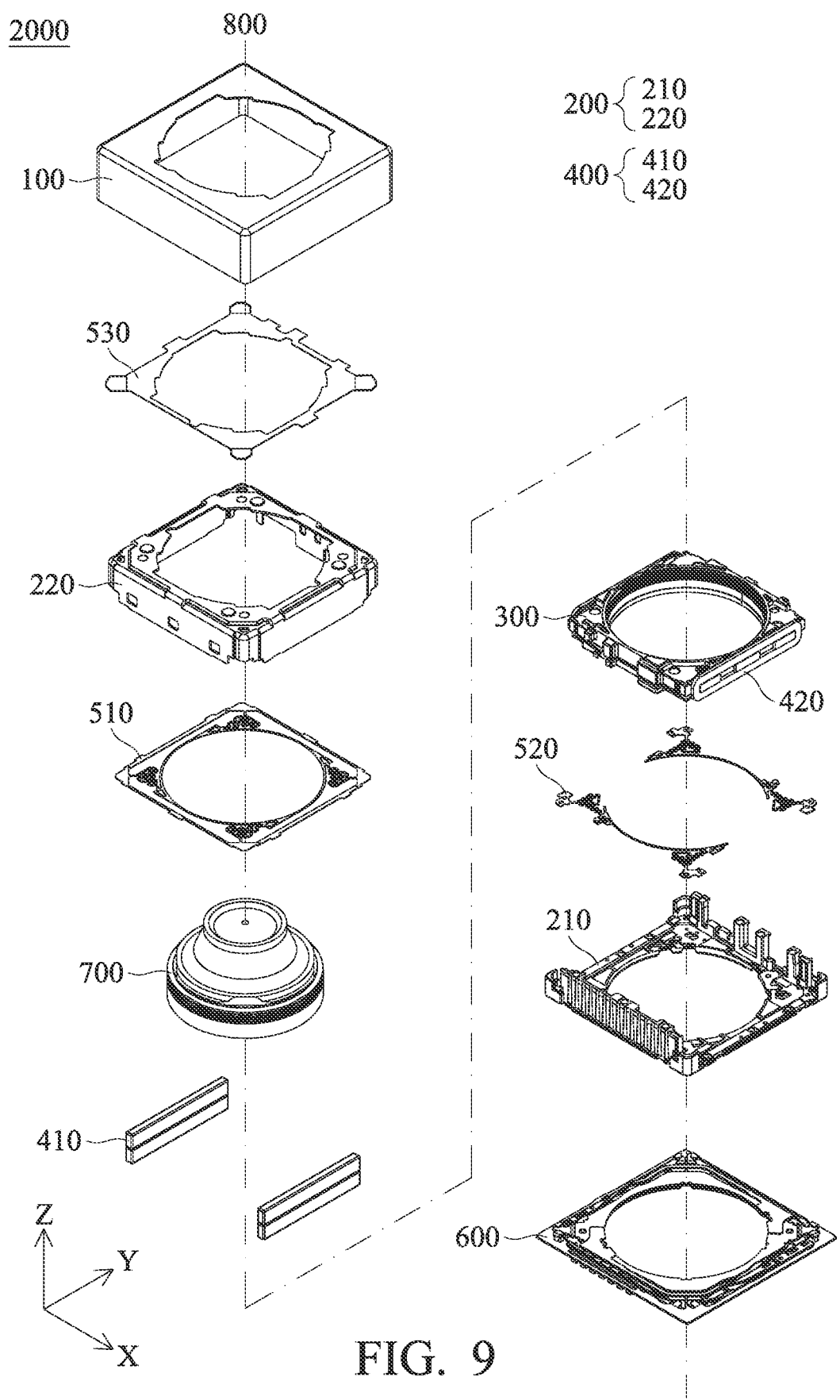
FIG. 9 is an exploded view of an optical element driving mechanism in some embodiments of the present disclosure.
Figure 10A:
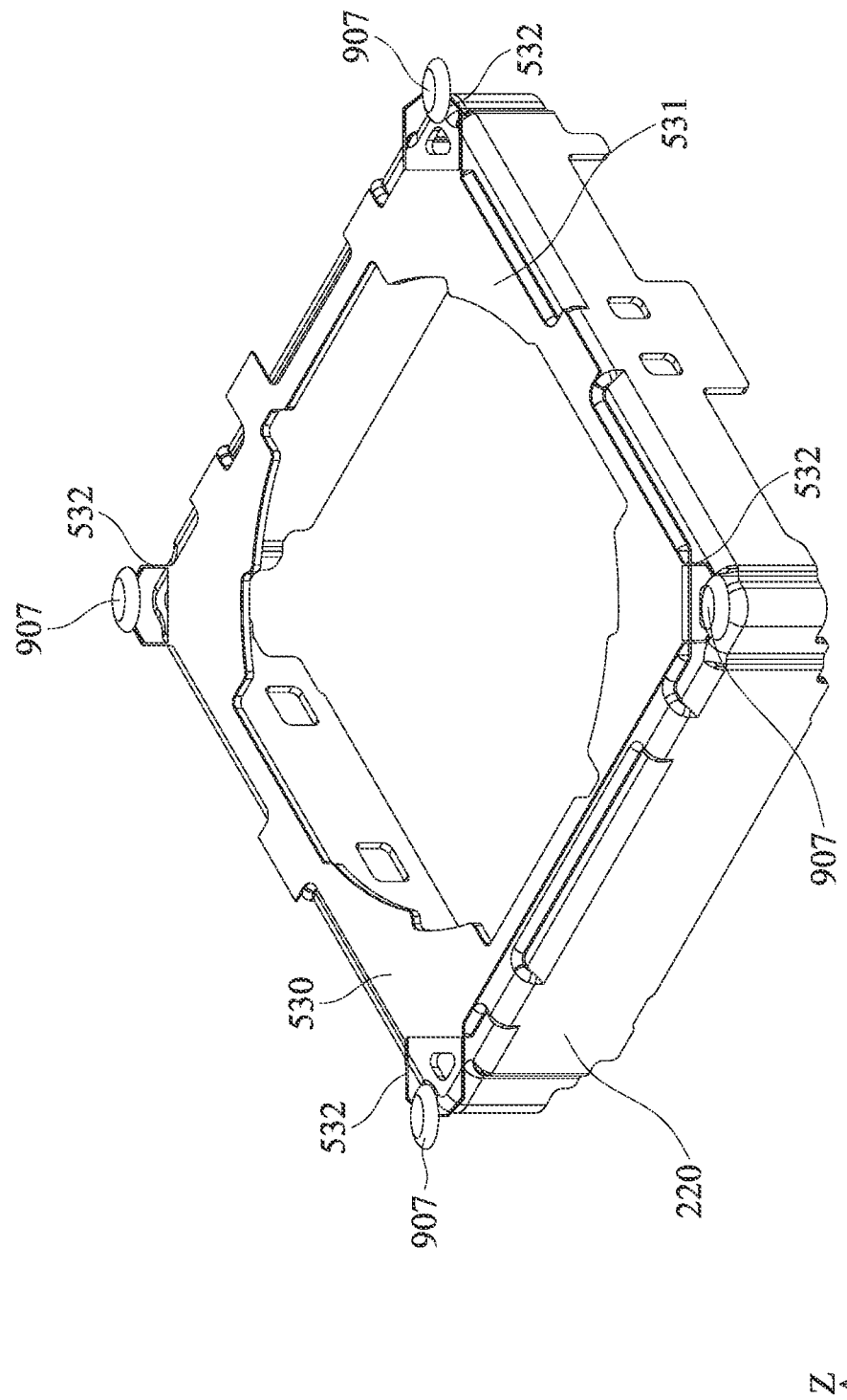
FIG. 10A and FIG. 10B is a schematic view of the frame and the third resilient element.
Figure 10B:
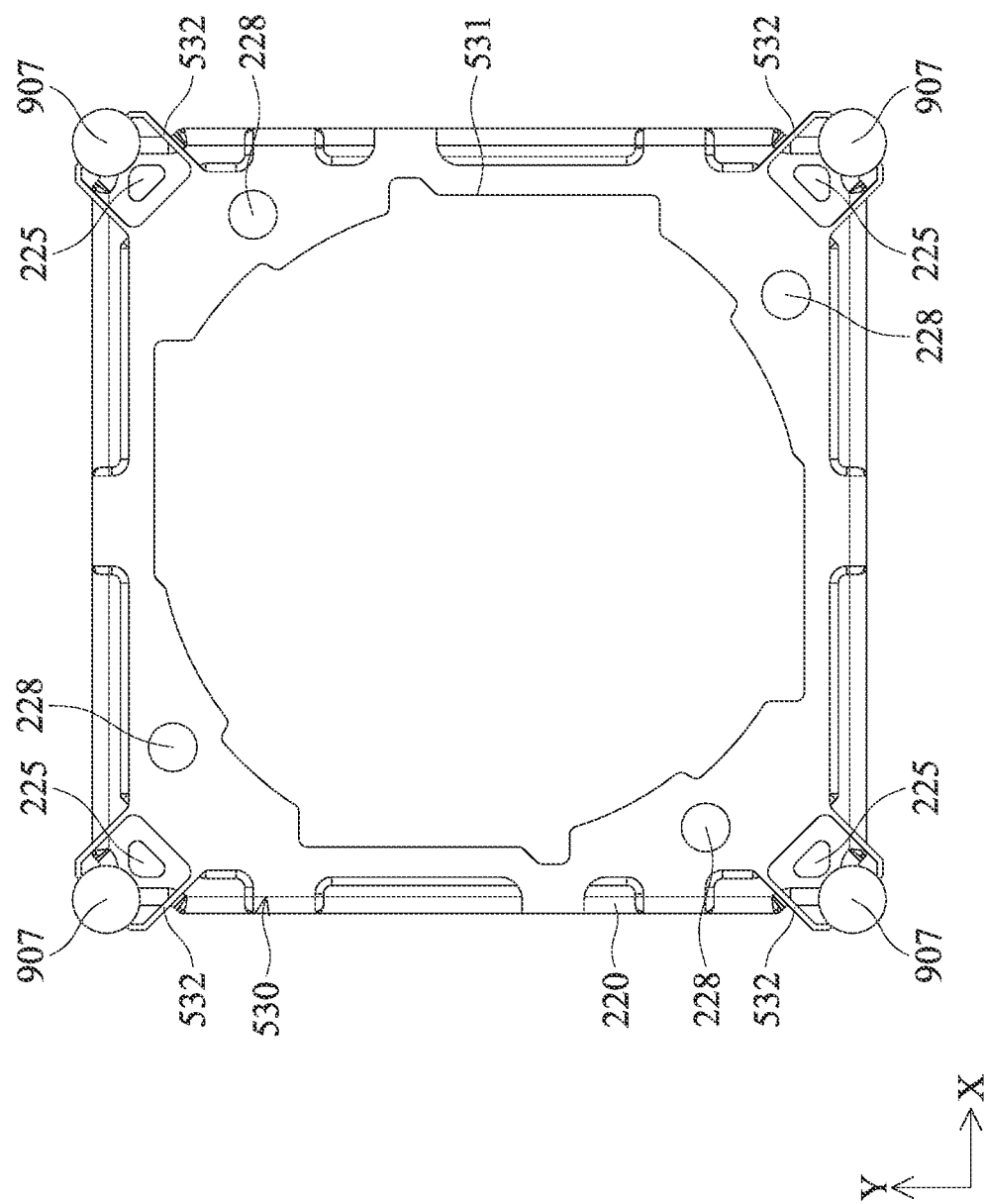

FIG. 9 is an exploded view of an optical element driving mechanism 2000 in some embodiments of the present disclosure. The optical element driving mechanism 2000 may has similar elements to the optical element driving mechanism 1000, and the difference is that the optical element driving mechanism 2000 may further include a third resilient element 530 disposed between the frame 220 and the case 100 (the fixed portion). FIG. 10A and FIG. 10B is a schematic view of the frame 220 and the third resilient element 530. The third resilient element 530 may include a main body 531 and outer string portion 532 disposed at corners of the main body 531. The main body 531 may be in direct contact with the first surface 221 of the frame 220, such as may be affixed on the first surface 221. The outer string portion 532 may extend in directions that are away from the main axis 800. A seventh adhesive element 907 may be provided on the outer string portion 532. When viewed in the Z direction, as shown in FIG. 10B, the seventh adhesive element 907 does not overlap the second opening 225. The first protruding portion 228 may be exposed from the third resilient element 530, so the relative position between the frame 220 and the third resilient element 530 may be defined.

Figure 10C:
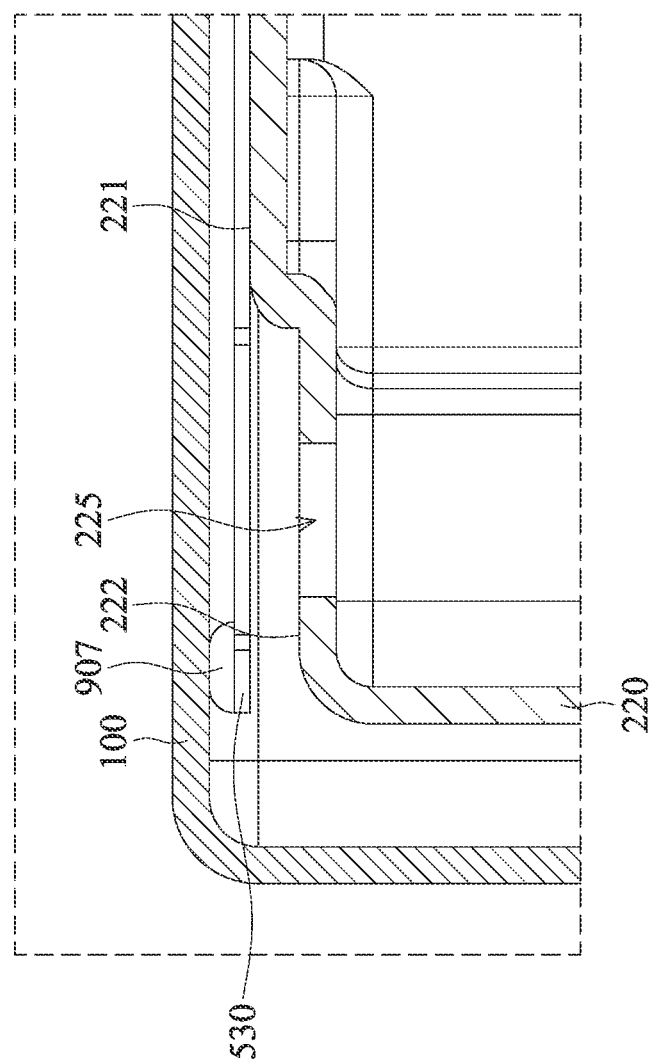
FIG. 10C is a cross-sectional view of some elements of the optical element driving mechanism.

FIG. 10C is a cross-sectional view of some elements of the optical element driving mechanism 2000, wherein the case 100, the frame 220, the third resilient element 530, and the seventh adhesive element 907 are mainly shown. The seventh adhesive element 907 may be in direct contact with the case 100 to prevent resonance occurs when the frame 220 moving relative to the case 100.

Figure 10D:
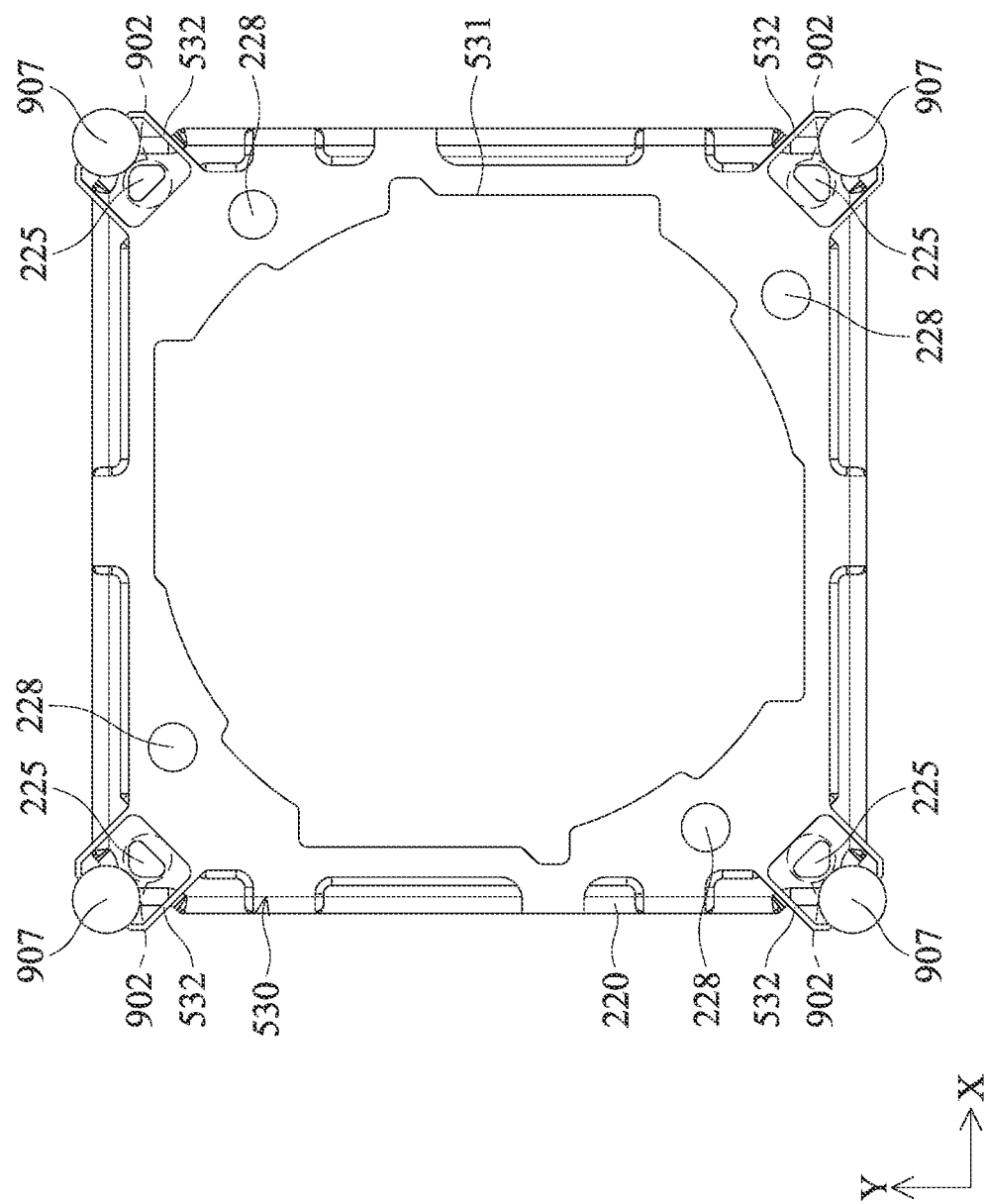
FIG. 10D and FIG. 10E are schematic views when the second adhesive element and the seventh adhesive element are provided at a same time.
Figure 10E:
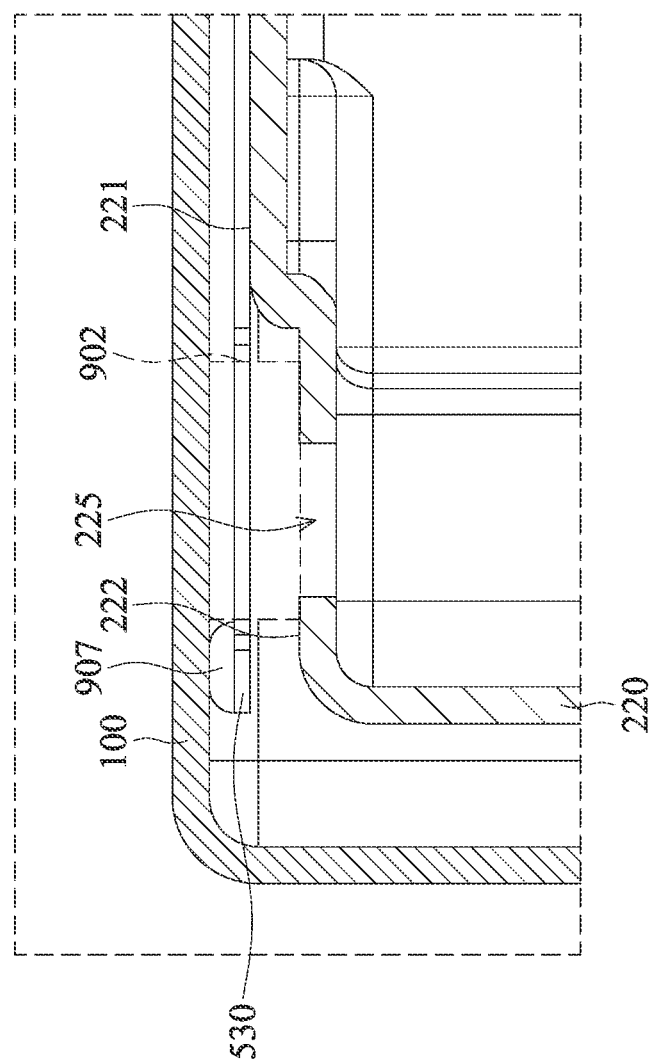

In some embodiments, the second adhesive element 902 and the seventh adhesive element 907 may be provided at a same time. For example, FIG. 10D and FIG. 10E are schematic views when the second adhesive element 902 and the seventh adhesive element 907 are provided at a same time. As shown in FIG. 10D, the second adhesive element 902 and the seventh adhesive element 907 do not overlap each other when viewed in the Z direction. The outer string portion 532 surrounds the second adhesive element 902, which means the second adhesive element 902 may be not in direct contact with the third resilient element 530. As shown in FIG. 10E, both of the second adhesive element 902 and the seventh adhesive element 907 may be in direct contact with the case 100 to prevent resonance occurs when the frame 220 moving relative to the case 100.

Figure 11A:
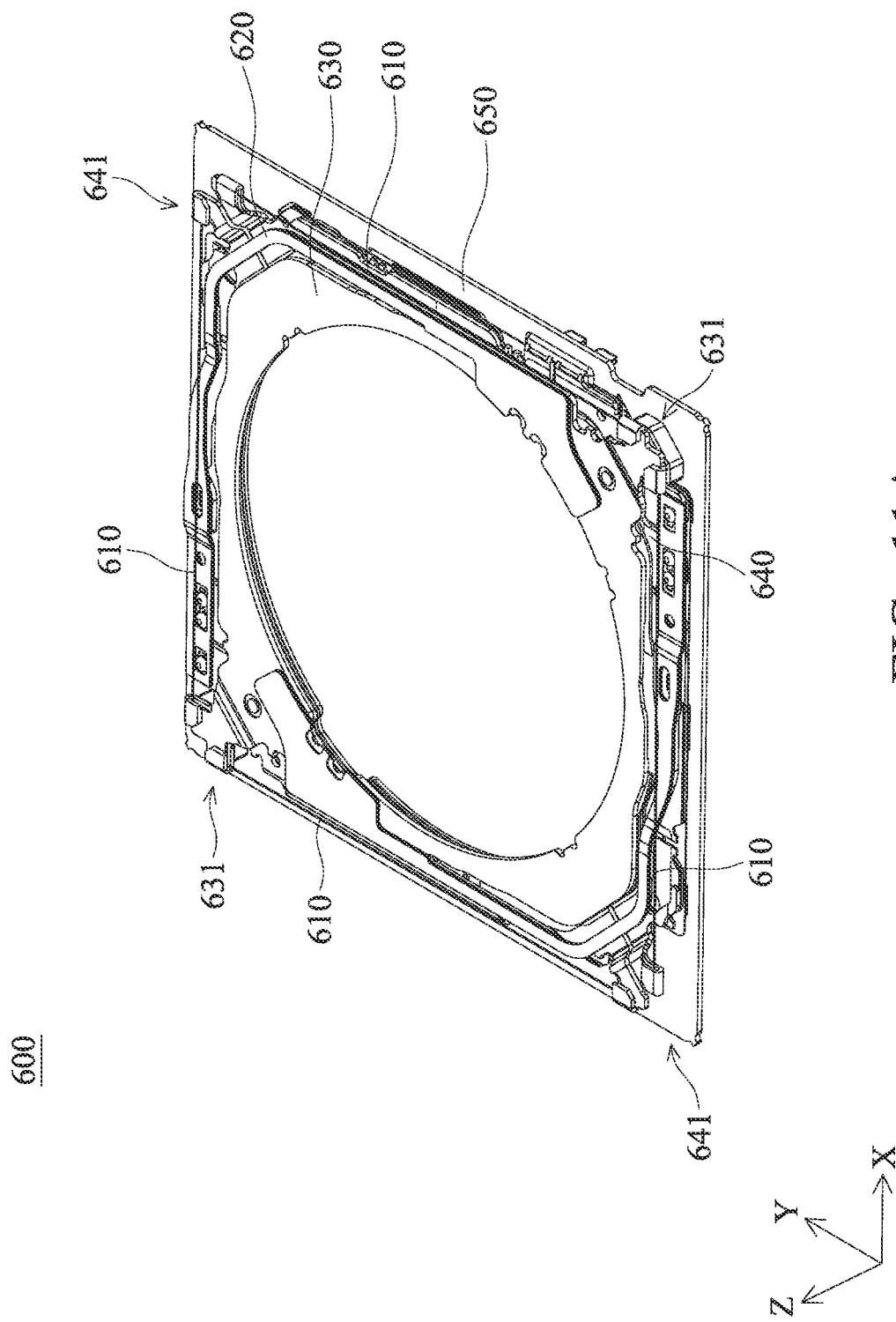
FIG. 11A, FIG. 11B, and FIG. 11C are schematic views of the second driving assembly viewed in different directions.
Figure 11B:
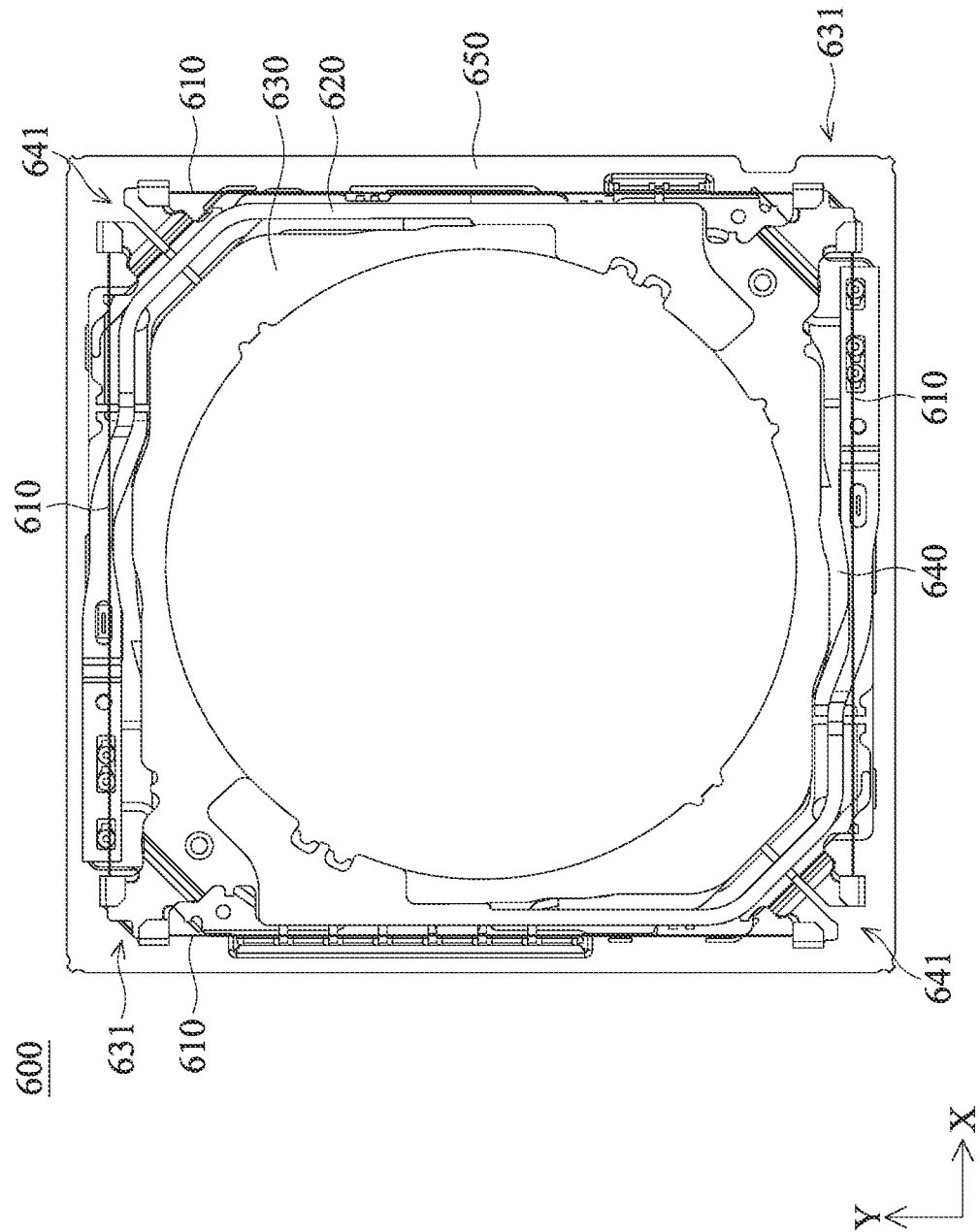
Figure 11C:
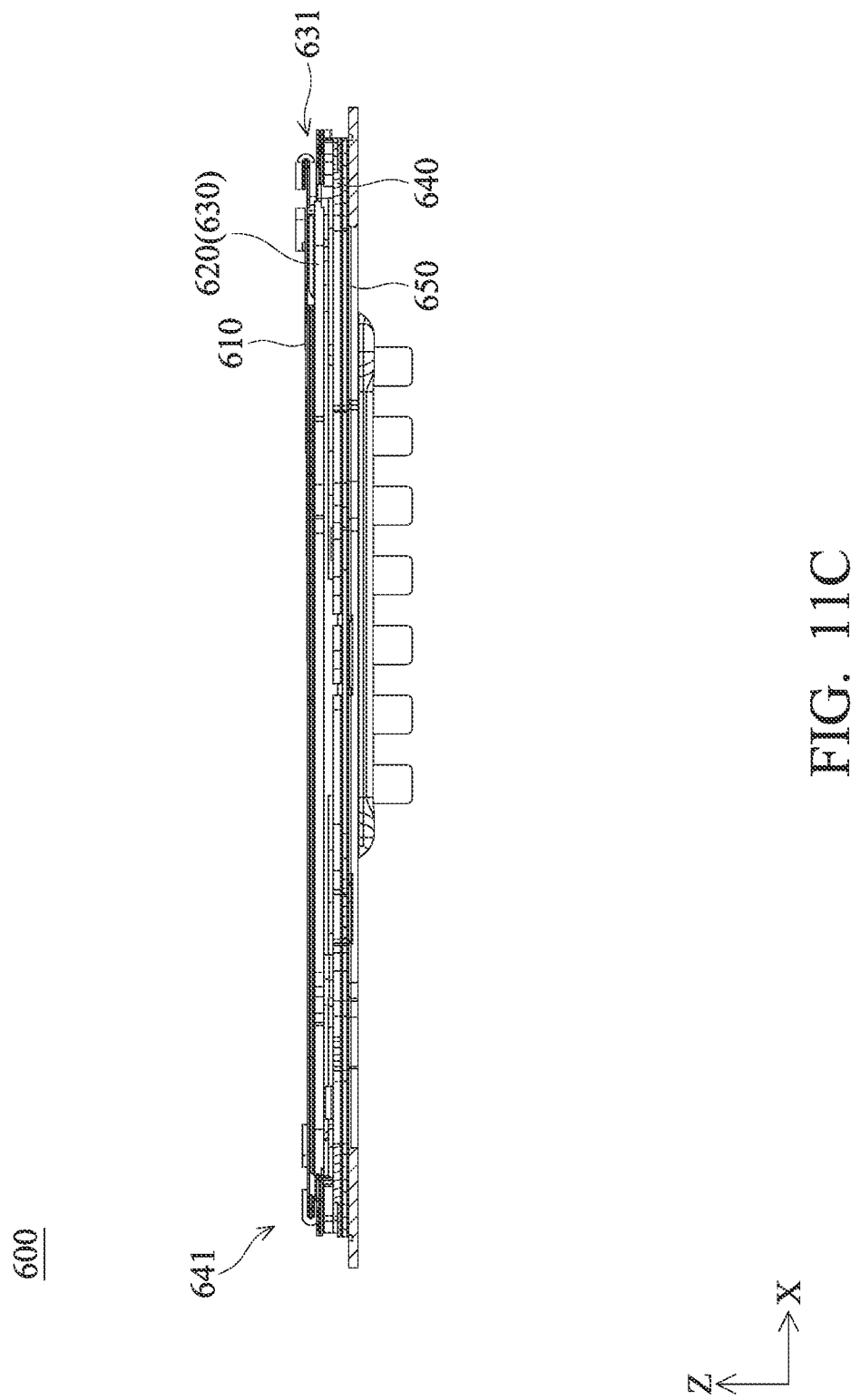

FIG. 11A, FIG. 11B, and FIG. 11C are schematic views of the second driving assembly 600 viewed in different directions. In some embodiments, as shown in FIG. 11A, FIG. 11B, and FIG. 11C, the second driving assembly 600 may mainly include a plurality of third driving element 610, a connecting element 620, a second movable portion 630, a third circuit element 640, and a substrate 650.

The second movable portion 630 may be affixed on the bottom 210, such as affixed by the sixth adhesive element 906 in FIG. 7B. The connecting element 620 may be used for elastically connect the second movable portion 630 and the third circuit element 640 to allow the second movable portion 630 move relative to the third circuit element 640. The third circuit element 640 may be affixed on the substrate 650. The substrate 650 may be affixed on the case 100 (the fixed portion). The third driving element 610 may connect to the first connecting portion 631 of the second movable portion 630 and the second connecting portion 641 of the third circuit element 640 to drive the second movable portion 630 to move relative to the third circuit element 640.

In some embodiments, the material of the third driving element 610 may include shape memory alloy (SMA), and may be strip-shaped and extending in a direction. Shape memory allow is an alloy that can eliminate the deformation in lower temperature by heating. In some embodiments, when the shape memory alloy performs plastic deformation under its phase transition temperature, it may return to its original shape by heating. Therefore, the second movable portion 630 may be driven to move relative to the third circuit element 640, and the optical element 700 may be moved accordingly to achieve optical image stabilization.

An optical element driving mechanism is provided in some embodiments. The optical element driving mechanism includes a fixed portion, a first movable portion, and a second driving assembly. The first movable portion and the fixed portion are arranged in a main axis. The first movable portion is movable relative to the fixed portion. The second driving assembly is used for driving the first movable portion to move relative to the fixed portion. When viewed along the main axis, the first movable portion includes a frame, the frame is polygonal, and has a second concave portion at the corner. Therefore, optical image stabilization and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
   a fixed portion;
   a first movable portion arranged with the fixed portion in a main axis, and the first movable portion is movable relative to the fixed portion; and
   a second driving assembly used for driving the first movable portion to move relative to the fixed portion;
   wherein when viewed along the main axis, the first movable portion comprises a frame, the frame is polygonal, and a second concave portion is at a corner of the frame, wherein the frame comprises:
   a third surface parallel to the main axis; and
   a third opening on the third surface.

2. The optical element driving mechanism as claimed in claim 1, wherein the frame further comprises:
   a first surface perpendicular to the main axis;
   a second surface perpendicular to the main axis;
   a first opening on the first surface;
   a second opening on the second surface;
   a fourth opening on the third surface;
   a first protruding portion on the first surface;
   a first concave portion on the first surface; and
   a third concave portion on the third surface.

3. The optical element driving mechanism as claimed in claim 2, wherein:
   the first surface does not intersect the second surface;
   the first movable portion further comprises a bottom;
   the first protruding portion protrudes from the first surface to a direction that is away from the bottom;

the first concave portion is concave from the surface to the bottom;

the second opening is at the corner of the frame;

when viewed along the main axis, the second concave portion is concave to the main axis;

when viewed along the main axis, the bottom is polygonal;

the bottom comprises a first strengthening portion at a corner of the bottom;

the first strengthening portion corresponds to the second concave portion;

the first strengthening portion extends in a direction that the main axis extends;

when viewed along the main axis, the distance between the second concave portion and the main axis is less than the distance between the first strengthen portion and the main axis;

in a direction that is perpendicular to the main axis, at least a portion of the first strengthen portion overlaps the second concave portion.

4. The optical element driving mechanism as claimed in claim 3, further comprising:
a first adhesive element;
a holder used for connecting to an optical element; and
a first driving assembly used for driving the holder to move relative to the first movable portion;
wherein:
the first driving assembly comprises:
a first driving element disposed on the frame; and
a second driving element disposed on the holder;
the second concave portion comprises:
a fourth surface facing the first driving element and is parallel to the main axis; and
a fifth surface perpendicular to the main axis;
the first adhesive element is in direct contact with the first driving element, the fourth surface, and the fifth surface.

5. The optical element driving mechanism as claimed in claim 4, further comprising:
a second adhesive element disposed on the frame;
a first circuit element disposed on the first movable portion;
a second circuit element disposed on the first movable portion;
a first conductive element disposed on the first circuit element and the second circuit element;
a third adhesive element disposed on the first circuit element; and
a fourth adhesive element disposed on the first circuit element;
wherein:
the second adhesive element is in direct contact with the first surface;
the second adhesive element is in direct contact with the second surface;
the second adhesive element is disposed on the second opening.

6. The optical element driving mechanism as claimed in claim 5, wherein:
when viewed in a direction that is perpendicular to the main axis and calculated from the second surface, a first height of the second adhesive element is different from a second height of the first protruding portion;
when viewed along the main axis, the second adhesive element does not overlap the first protruding portion;

in a direction that is perpendicular to the main axis, at least a portion of the second adhesive element overlaps the first protruding portion;

the second circuit element is embedded in the frame;

when viewed in a direction that is perpendicular to the main axis, at least a portion of the first circuit element overlaps the second circuit element;

the first circuit element comprises a fifth opening and a fourth concave portion.

7. The optical element driving mechanism as claimed in claim 6, wherein:
when viewed in a direction that is perpendicular the main axis, at least a portion of the second circuit element is exposed from the fourth concave portion;
when viewed in a direction that is perpendicular the main axis, at least a portion of the fourth adhesive element overlaps the first conductive element;
when viewed in a direction that is perpendicular the main axis, at least a portion of the fourth adhesive element overlaps the fourth concave portion;
when viewed in a direction that is perpendicular the main axis, a portion of the frame is exposed form the fifth opening;
when viewed in a direction that is perpendicular the main axis, the third adhesive element covers the fifth opening;
the fourth adhesive element is disposed on the third concave portion.

8. The optical element driving mechanism as claimed in claim 7, wherein:
the bottom further comprises:
a first recess, a second recess, a third recess, a fourth recess, a fifth recess, a sixth recess, a seventh recess, an eighth recess, and a ninth recess on a sixth surface of the bottom;
a first supporting portion extending along the main axis;
a second supporting portion extending along the main axis;
a third supporting portion extending along the main axis;
a fourth supporting portion extending along the main axis;
a first extending portion position on the second supporting portion and extending in a direction that is perpendicular to the main axis;
a second extending portion position on the third supporting portion and extending in a direction that is perpendicular to the main axis; and
a third extending portion position on the fourth supporting portion and extending in a direction that is perpendicular to the main axis.

9. The optical element driving mechanism as claimed in claim 8, wherein:
the second circuit element comprises:
a first circuit unit exposed from the sixth surface;
a second circuit unit exposed from the sixth surface;
a third circuit unit exposed from the sixth surface;
a fourth circuit unit exposed from the sixth surface;
a fifth circuit unit exposed from the sixth surface;
a sixth circuit unit exposed from the sixth surface.

10. The optical element driving mechanism as claimed in claim 9, wherein:
when viewed in a direction that is perpendicular to the main axis:
the first recess, the second recess, the third recess, and the fourth recess are adjacent to the first circuit unit;
the first recess and the third recess are at opposite sides of the first circuit unit;

the first recess and the third recess are arranged in a direction that is perpendicular to the main axis;

the second recess and the fourth recess are at opposite sides of the first circuit unit;

the second recess and the fourth recess are arranged in a direction that is perpendicular to the main axis;

the first recess and the second recess are arranged in a direction that is parallel to the main axis.

11. The optical element driving mechanism as claimed in claim 10, wherein:

the third recess and the fourth recess are arranged in a direction that is parallel to the main axis;

the first circuit unit has a third height in the direction that the main axis extends;

the second circuit unit has a fourth height in the direction that the main axis extends;

the fourth circuit unit has a fifth height in the direction that the main axis extends;

the first supporting portion has a sixth height in the direction that the main axis extends;

the third height and the fourth height are different;

the third height and the fifth height are different;

the third height and the sixth height are different.

12. The optical element driving mechanism as claimed in claim 11, wherein:

the first circuit element is between the first supporting portion and the second supporting portion;

the fifth recess, the sixth recess, the seventh recess, and the eighth recess are arranged in a direction that is perpendicular to the main axis;

the fourth recess is adjacent to the second circuit element;

the fourth circuit unit is between the fifth recess and the sixth recess;

the fifth circuit unit is between the sixth recess and the seventh recess;

the sixth circuit unit is between the seventh recess and the eighth recess;

the ninth recess is position on the fourth supporting portion;

the first extending portion is in direct contact with the first circuit element;

the second extending portion is in direct contact with the first circuit element;

the third extending portion is in direct contact with the first circuit element.

13. The optical element driving mechanism as claimed in claim 12, wherein:

the first extending portion and the first circuit element are arranged in the direction that the main axis extends;

the second extending portion and the first circuit element are arranged in the direction that the main axis extends;

the third extending portion and the first circuit element are arranged in the direction that the main axis extends;

the second adhesive element covers the second opening;

when viewed along a direction that is perpendicular to the main axis and calculating from the second surface, the first height of the second adhesive element is greater than the second height of the first protruding portion.

14. The optical element driving mechanism as claimed in claim 13, wherein:

the third adhesive element is disposed between the first circuit element and the bottom;

the third adhesive element is disposed in the ninth recess;

when viewed along a direction that is perpendicular to the main axis, the third adhesive element has a third width between the first circuit element and the bottom;

when viewed along a direction that is perpendicular to the main axis, the ninth recess has a fourth width in the direction that the main axis extends;

the third width is greater than the fourth width;

when viewed in a direction that is perpendicular to the main axis, the fifth opening has a fifth width;

the third width is greater than the fifth width;

the third height is greater than the fourth height;

the third height is greater than the fifth height;

the third height is less than the sixth height;

the fourth height is less than the fifth height.

15. The optical element driving mechanism as claimed in claim 14, wherein:

the bottom surface comprises a fifth opening, a sixth opening, a seventh opening, and an eighth opening disposed on a seventh surface of the bottom;

the seventh surface is perpendicular to the main axis;

the seventh surface faces away from the fixed portion;

the second circuit element further comprises a first circuit contact, a second circuit contact, a third circuit contact, and a fourth circuit contact exposed from the seventh surface;

the optical element driving mechanism further comprises a second conductive element, a third conductive element, a fourth conductive element, and a fifth conductive element disposed on the first circuit contact, the second circuit contact, the third circuit contact, and the fourth circuit contact, respectively;

when viewed along the main axis, the first circuit contact, the second circuit contact, the third circuit contact, and the fourth circuit contact at least partially expose from the second conductive element, the third conductive element, the fourth conductive element, and the fifth conductive element, respectively.

16. The optical element driving mechanism as claimed in claim 15, wherein:

the second conductive element and the third conductive element are position at a side of the main axis that is opposite to the fourth conductive element and the fifth conductive element;

when viewed in a direction that is perpendicular to the main axis, the fifth opening has a minimum dimension that equals to a first width;

the optical element driving mechanism further comprises a sixth adhesive element disposed between the bottom and the second driving assembly;

the sixth adhesive element is disposed in the fifth opening and has a second width;

the second width is greater than the first width;

the fifth opening and the seventh opening have different shapes;

the fifth opening and the eighth opening have different shapes;

the sixth opening and the seventh opening have different shapes;

the sixth opening and the eighth opening have different shapes.

17. The optical element driving mechanism as claimed in claim 16, wherein:

when viewed in a direction that is perpendicular to the main axis, the holder comprises:

a first holder recess exposed from the second driving element;

a second holder recess at least partially overlaps the second driving element;

a third holder recess at least partially overlaps the second driving element; and a tilted surface between the first holder recess and the second holder recess.

18. The optical element driving mechanism as claimed in claim 17, wherein:
when viewed along the main axis, at least a portion of the first holder recess overlaps the second driving element;
when viewed along the main axis, at least a portion of the second holder recess overlaps the second driving element;
when viewed along the main axis, the third holder recess is exposed from the second driving element;
when viewed in a direction that is perpendicular to the main axis, the tilted surface is exposed from the second driving element;
when viewed along the main axis, the holder further comprises a first stopping portion and a second stopping portion extending in a direction that is perpendicular to the main axis;
when viewed along the main axis, the first stopping portion is between the second supporting portion and the third supporting portion;
when viewed along the main axis, the second stopping portion is between the third supporting portion and the fourth supporting portion;
when viewed along the main axis, in a direction that is perpendicular to the main axis, the distance between the holder and the fourth supporting portion is less than the distance between the second stopping portion and the first circuit element.

19. The optical element driving mechanism as claimed in claim 18, further comprising:
a third resilient element disposed between the frame and the fixed portion; and
a seventh adhesive element disposed on the third resilient element;
wherein:
when viewed along the main axis:
the third resilient element is polygonal and comprises a main body and an outer string portion, the outer string portion is position at a corner of the main body and extends from the main body in a direction that is far away from the main axis;
the seventh adhesive element is disposed on the outer string portion;
the seventh adhesive element does not overlap the second opening;
the seventh adhesive element does not overlap the second adhesive element;
the seventh adhesive element is in direct contact with the fixed portion;
the outer string portion surrounds the second adhesive element;
the first protruding portion is exposed from the third resilient element;
the third resilient element covers the first concave portion.

20. The optical element driving mechanism as claimed in claim 19, wherein the second driving assembly comprises:
a substrate disposed on the fixed portion;
a second movable portion disposed on the bottom;
a third circuit element disposed on the substrate;
a third driving element used for driving the second movable portion to move relative to the fixed portion; and
a connecting element movably connects the second movable portion and the third circuit element;
wherein:
the second movable portion comprises a first connecting portion;
the third circuit element comprises a second connecting portion;
the third driving element is in direct contact with the first connecting portion and the second connecting portion.

* * * * *